(12) United States Patent
Yuan et al.

(10) Patent No.: US 12,652,135 B2
(45) Date of Patent: Jun. 9, 2026

(54) REALLOCATION OF PADDED ACKNOWLEDGMENT RESOURCES

(71) Applicant: QUALCOMM Incorporated, San Diego, CA (US)

(72) Inventors: Fang Yuan, Beijing (CN); Sony Akkarakaran, Poway, CA (US); Yan Zhou, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 291 days.

(21) Appl. No.: 18/554,453

(22) PCT Filed: Jun. 28, 2021

(86) PCT No.: PCT/CN2021/102638
§ 371 (c)(1),
(2) Date: Oct. 6, 2023

(87) PCT Pub. No.: WO2023/272420
PCT Pub. Date: Jan. 5, 2023

(65) Prior Publication Data
US 2024/0204923 A1 Jun. 20, 2024

(51) Int. Cl.
*H04L 1/1829* (2023.01)
*H04W 72/23* (2023.01)

(52) U.S. Cl.
CPC ........... *H04L 1/1861* (2013.01); *H04W 72/23* (2023.01)

(58) Field of Classification Search
CPC ............................ H04L 1/1861; H04W 72/23
See application file for complete search history.

(56) References Cited

U.S. PATENT DOCUMENTS

2011/0242997 A1* 10/2011 Yin ........................ H04W 72/02
370/252
2012/0039280 A1* 2/2012 Chen ...................... H04B 17/24
370/329

(Continued)

FOREIGN PATENT DOCUMENTS

CN          103843277 A      6/2014
WO     WO-2007081564 A2      7/2007
WO     WO-2021087980 A1      5/2021

OTHER PUBLICATIONS

International Search Report and Written Opinion—PCT/CN2021/102638—ISA/EPO—Mar. 28, 2022.

*Primary Examiner* — Michael J Moore, Jr.
(74) *Attorney, Agent, or Firm* — Holland & Hart LLP\Qualcomm

(57) ABSTRACT

This disclosure provides systems, methods, and apparatus, including computer programs encoded on computer-readable media, for reallocating padded acknowledgment resources. A user equipment (UE) may be configured to use resources allocated for acknowledgment feedback that may be otherwise associated with padded feedback bits for additional reporting bits. For example, if acknowledgment feedback includes at least one positive acknowledgment (ACK) bit, the UE may replace (for example, reallocate) one or more padded feedback bits with additional reporting bits. If the UE is unable to receive an instance of downlink control information (DCI), or if the UE unsuccessfully receives or decodes each scheduling unit scheduled by an instance of DCI, the UE may maintain padded feedback bits acknowledgment feedback. In various implementations, additional reporting bits may indicate one or more of a power headroom (PH) value, a modulation and coding scheme (MCS), a preferred beam configuration, or a maximum permissible exposure (MPE) value.

24 Claims, 9 Drawing Sheets

(56)  References Cited

U.S. PATENT DOCUMENTS

| | | | |
|---|---|---|---|
| 2012/0088533 A1 | 4/2012 | Khoshnevis et al. | |
| 2015/0195816 A1* | 7/2015 | Lee | H04W 28/06 |
| | | | 370/329 |
| 2018/0167171 A1* | 6/2018 | Wu | H04L 1/1816 |
| 2020/0235862 A1* | 7/2020 | Di Taranto | H04L 1/1861 |
| 2020/0295878 A1* | 9/2020 | Choi | H04W 28/04 |
| 2021/0219329 A1* | 7/2021 | Zhou | H04L 1/1819 |
| 2022/0369136 A1* | 11/2022 | Goektepe | H04L 1/1896 |
| 2022/0369336 A1* | 11/2022 | Huang | H04L 5/0055 |
| 2024/0063951 A1* | 2/2024 | Yin | H04L 1/1861 |
| 2024/0146466 A1* | 5/2024 | Yin | H04L 1/1671 |
| 2024/0171319 A1* | 5/2024 | Yin | H04W 72/56 |
| 2024/0178943 A1* | 5/2024 | Yin | H04L 1/1854 |

* cited by examiner

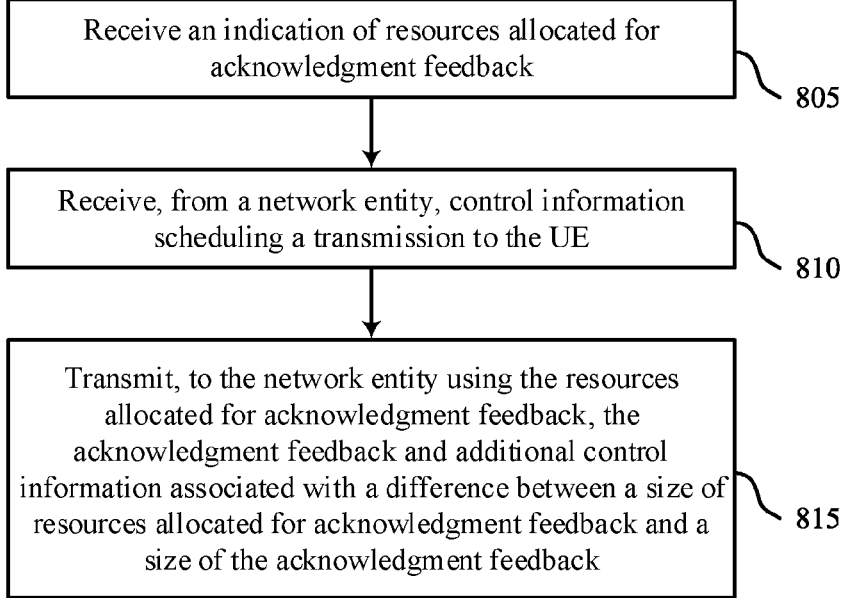

Receive an indication of resources allocated for acknowledgment feedback

805

Receive, from a network entity, control information scheduling a transmission to the UE

810

Transmit, to the network entity using the resources allocated for acknowledgment feedback, the acknowledgment feedback and additional control information associated with a difference between a size of resources allocated for acknowledgment feedback and a size of the acknowledgment feedback

REALLOCATION OF PADDED ACKNOWLEDGMENT RESOURCES

CROSS REFERENCE

The present application is a 371 national stage filing of International PCT Application No. PCT/CN2021/102638 by YUAN et al. entitled "REALLOCATION OF PADDED ACKNOWLEDGMENT RESOURCES," filed Jun. 28, 2021, which is assigned to the assignee hereof, and which is expressly incorporated by reference in its entirety herein.

TECHNICAL FIELD

This disclosure relates to wireless communications, including reallocation of padded acknowledgment resources

DESCRIPTION OF THE RELATED TECHNOLOGY

Wireless communications systems are widely deployed to provide various types of communication content such as voice, video, packet data, messaging, broadcast, and so on. These systems may be capable of supporting communication with multiple users by sharing the available system resources (for example, time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations (BSs) or one or more network access nodes, each simultaneously supporting communication for multiple communication devices, which may be otherwise known as user equipment (UE).

In some wireless communications systems, a BS may schedule a downlink transmission to a UE based on transmitting an instance of downlink control information (DCI) to the UE. In some implementations, the BS may configure the UE to transmit hybrid automatic repeat request (HARQ) feedback for the scheduled downlink transmission. The HARQ feedback may include one or more acknowledgment (ACK) bits or negative ACK (NACK) bits.

SUMMARY

The systems, methods and devices of this disclosure each have several innovative aspects, no single one of which is solely responsible for the desirable attributes disclosed herein.

One innovative aspect of the subject matter described in this disclosure can be implemented in an apparatus for wireless communication. The apparatus may include a first interface configured to receive or otherwise obtain an indication of resources allocated for acknowledgment feedback and receive or otherwise obtain, from a network entity, control information scheduling a transmission to the UE. The apparatus also may include the first interface or a second interface configured to transmit or otherwise output, to the network entity using the resources allocated for acknowledgment feedback, the acknowledgment feedback and additional control information associated with a difference between a size of resources allocated for acknowledgment feedback and a size of the acknowledgment feedback.

Another innovative aspect of the subject matter described in this disclosure can be implemented in a method for wireless communication performed at a UE. The method may include receiving or otherwise obtaining an indication of resources allocated for acknowledgment feedback, receiving or otherwise obtaining, from a network entity, control information scheduling a transmission to the UE, and transmitting or otherwise outputting, to the network entity using the resources allocated for acknowledgment feedback, the acknowledgment feedback and additional control information associated with a difference between a size of resources allocated for acknowledgment feedback and a size of the acknowledgment feedback.

Another innovative aspect of the subject matter described in this disclosure can be implemented in an apparatus for wireless communication at a user equipment (UE). The apparatus may include a processor, memory coupled with the processor, and instructions stored in the memory. The instructions may be executable by the processor to cause the apparatus to receive or otherwise obtain an indication of resources allocated for acknowledgment feedback, receive or otherwise obtain, from a network entity, control information scheduling a transmission to the UE, and transmit or otherwise output, to the network entity using the resources allocated for acknowledgment feedback, the acknowledgment feedback and additional control information associated with a difference between a size of resources allocated for acknowledgment feedback and a size of the acknowledgment feedback.

Another innovative aspect of the subject matter described in this disclosure can be implemented in another apparatus for wireless communication at a UE. The apparatus may include means for receiving or otherwise obtaining an indication of resources allocated for acknowledgment feedback, means for receiving or otherwise obtaining, from a network entity, control information scheduling a transmission to the UE, and means for transmitting or otherwise outputting, to the network entity using the resources allocated for acknowledgment feedback, the acknowledgment feedback and additional control information associated with a difference between a size of resources allocated for acknowledgment feedback and a size of the acknowledgment feedback.

Another innovative aspect of the subject matter described in this disclosure can be implemented in a non-transitory computer-readable medium storing code for wireless communication at a UE. The code may include instructions executable by a processor to receive or otherwise obtain an indication of resources allocated for acknowledgment feedback, receive or otherwise obtain, from a network entity, control information scheduling a transmission to the UE, and transmit or otherwise output, to the network entity using the resources allocated for acknowledgment feedback, the acknowledgment feedback and additional control information associated with a difference between a size of resources allocated for acknowledgment feedback and a size of the acknowledgment feedback.

In some innovative aspects of the subject matter described in this disclosure that can be implemented in a method, an apparatus, or a non-transitory computer-readable medium, the control information may schedule transmission of a set of multiple transport blocks (TBs), and the method, apparatuses, and non-transitory computer-readable medium may include further operations, features, means, or instructions for generating the additional control information according to a difference between a size of the resources allocated for acknowledgment feedback for a first TB of the plurality and a size of the acknowledgment feedback for the first TB, and a difference between a size of the resources allocated for acknowledgment feedback for a second TB of the plurality and a size of the acknowledgment feedback for the second TB.

Another innovative aspect of the subject matter described in this disclosure can be implemented in an apparatus for wireless communication. The apparatus may include a first interface configured to transmit or otherwise output an indication of resources allocated for acknowledgment feedback and transmit or otherwise output control information scheduling a transmission to a user equipment (UE). The apparatus also may include the first interface or a second interface configured to receive or otherwise obtain, using the resources allocated for acknowledgment feedback, the acknowledgment feedback and additional control information associated with a difference between a size of the resources allocated for acknowledgment feedback and a size of the acknowledgment feedback.

Another innovative aspect of the subject matter described in this disclosure can be implemented in a method for wireless communication performed at a network entity. The method may include transmitting or otherwise outputting an indication of resources allocated for acknowledgment feedback, transmitting or otherwise outputting control information scheduling a transmission to a UE, and receiving or otherwise obtaining, using the resources allocated for acknowledgment feedback, the acknowledgment feedback and additional control information associated with a difference between a size of the resources allocated for acknowledgment feedback and a size of the acknowledgment feedback.

Another innovative aspect of the subject matter described in this disclosure can be implemented in an apparatus for wireless communication at a network entity. The apparatus may include a processor, memory coupled with the processor, and instructions stored in the memory. The instructions may be executable by the processor to cause the apparatus to transmit or otherwise output an indication of resources allocated for acknowledgment feedback, transmit or otherwise output control information scheduling a transmission to a UE, and receive or otherwise obtain, using the resources allocated for acknowledgment feedback, the acknowledgment feedback and additional control information associated with a difference between a size of the resources allocated for acknowledgment feedback and a size of the acknowledgment feedback.

Another innovative aspect of the subject matter described in this disclosure can be implemented in another apparatus for wireless communication at a network entity. The apparatus may include means for transmitting or otherwise outputting an indication of resources allocated for acknowledgment feedback, means for transmitting or otherwise outputting control information scheduling a transmission to a UE, and means for receiving or otherwise obtaining, using the resources allocated for acknowledgment feedback, the acknowledgment feedback and additional control information associated with a difference between a size of the resources allocated for acknowledgment feedback and a size of the acknowledgment feedback.

Another innovative aspect of the subject matter described in this disclosure can be implemented in a non-transitory computer-readable medium storing code for wireless communication at a network entity. The code may include instructions executable by a processor to transmit or otherwise output an indication of resources allocated for acknowledgment feedback, transmit or otherwise output control information scheduling a transmission to a UE, and receive or otherwise obtain, using the resources allocated for acknowledgment feedback, the acknowledgment feedback and additional control information associated with a difference between a size of the resources allocated for acknowledgment feedback and a size of the acknowledgment feedback.

In some innovative aspects of the subject matter described in this disclosure that can be implemented in a method, an apparatus, or a non-transitory computer-readable medium, the control information may schedule transmission of a set of multiple TBs, and receiving the additional control information may be associated with a difference between a size of the resources allocated for acknowledgment feedback for a first TB of the plurality and a size of the acknowledgment feedback for the first TB, and a difference between a size of the resources allocated for acknowledgment feedback for a second TB of the plurality and a size of the acknowledgment feedback for the second TB.

Details of one or more implementations of the subject matter described in this disclosure are set forth in the accompanying drawings and the description below. Other features, aspects, and advantages will become apparent from the description, the drawings and the claims. Note that the relative dimensions of the following figures may not be drawn to scale.

BRIEF DESCRIPTION OF THE DRAWINGS

FIGS. 8 and 9 show flowcharts illustrating example methods that support reallocation of padded acknowledgment resources.

Like reference numbers and designations in the various drawings indicate like elements.

DETAILED DESCRIPTION

Figure 1:
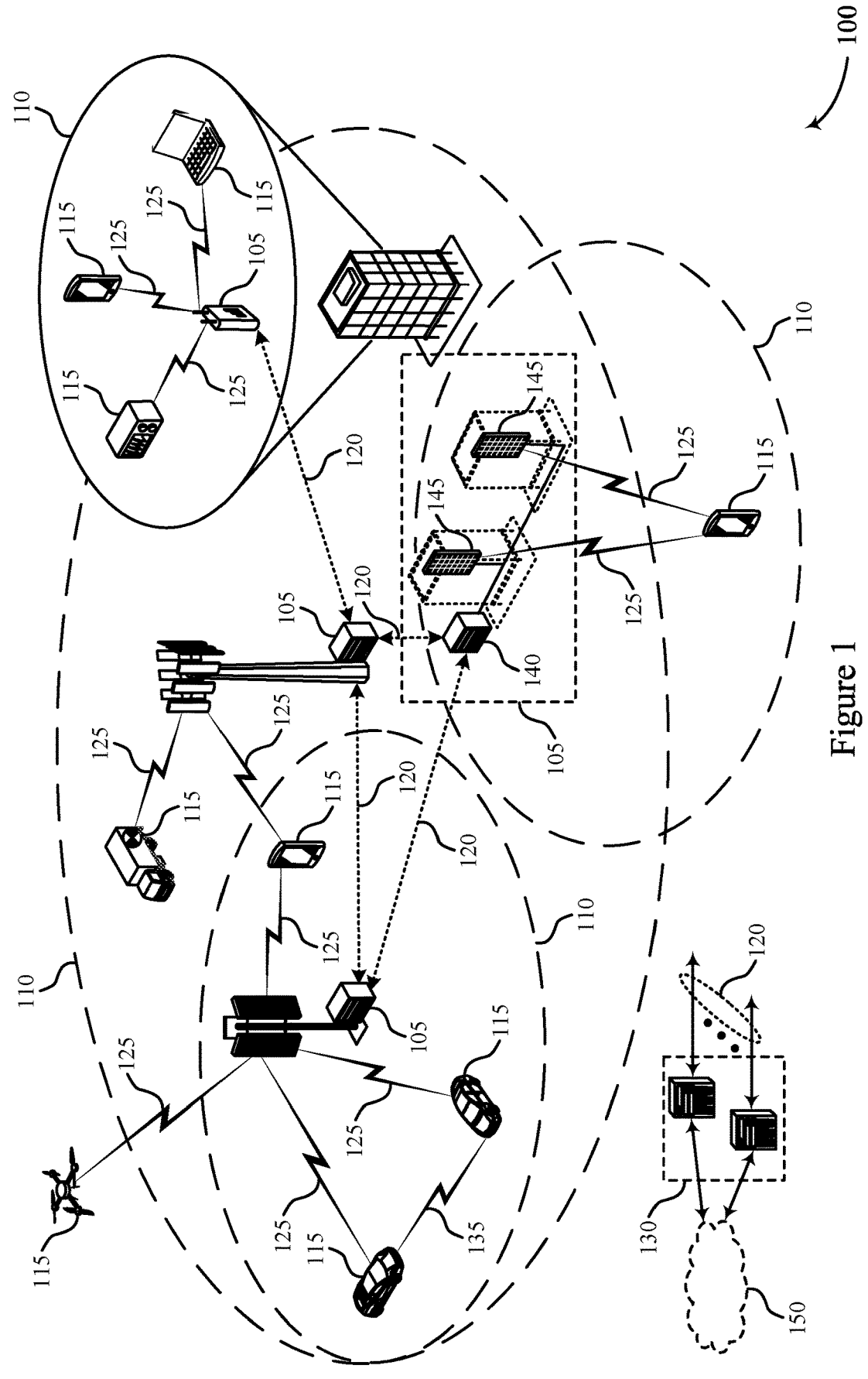
FIG. 1 illustrates an example of a wireless communications system that supports reallocation of padded acknowledgment resources.

The following description is directed to some implementations for the purposes of describing the innovative aspects of this disclosure. However, a person having ordinary skill in the art will readily recognize that the teachings herein can be applied in a multitude of different ways. The described implementations may be implemented in any device, system or network that is capable of transmitting and receiving radio frequency (RF) signals according to any of the Institute of Electrical and Electronics Engineers (IEEE) 16.11 standards, or any of the IEEE 802.11 standards, the Bluetooth® standard, code division multiple access (CDMA), frequency division multiple access (FDMA), time division multiple access (TDMA), Global System for Mobile communications (GSM), GSM/General Packet Radio Service (GPRS), Enhanced Data GSM Environment (EDGE), Terrestrial Trunked Radio (TETRA), Wideband-CDMA (W-CDMA), Evolution Data Optimized (EV-DO), 1×EV-DO, EV-DO Rev A, EV-DO Rev B, High Speed Packet Access (HSPA), High Speed Downlink Packet Access (HSDPA), High Speed Uplink Packet Access (HSUPA), Evolved High Speed Packet Access (HSPA+), Long Term Evolution (LTE), AMPS, or other known signals that are used to communicate within a wireless, cellular or internet of things (IOT) network, such as a system utilizing 3G, 4G or 5G, or further implementations thereof, technology.

In some wireless communications systems, a network entity, such as a base station (BS) or a component of a base station (such as in a disaggregated radio access network (D-RAN) or an open RAN (O-RAN)), may schedule downlink transmissions to a user equipment (UE) by transmitting an instance of downlink control information (DCI) to the UE. The scheduled downlink transmissions may include a quantity of scheduling units, such as a quantity of transport blocks (TBs) or code block groups (CBGs). The network entity may configure the UE to transmit acknowledgment feedback, such as hybrid automatic repeat request (HARQ) feedback, for the scheduled downlink transmissions, which may include transmitting an indication of resources allocated for the HARQ feedback (for example, an allocation of resources for uplink control information (UCI)). An allocation of resources for acknowledgment feedback by the UE may include multiple bits, with each bit corresponding to feedback for a scheduling unit (for example, a bit for each TB or a bit for each CBG)

The UE may transmit the HARQ feedback to the network entity (for example, using the allocated resources) based on generating a HARQ codebook that includes a quantity of feedback bits corresponding to the instance of DCI. Specifically, the HARQ codebook may include acknowledgment (ACK) or negative acknowledgment (NACK) bits for each TB or CBG scheduled by the instance of DCI. In some implementations, a quantity of TBs or CBGs scheduled by the instance of DCI may be less than the quantity of bits in the HARQ codebook corresponding to the instance of DCI (for example, less than a quantity of bits allocated for the HARQ codebook or less than a size of the HARQ codebook). In such implementations, the UE may include one or more padded bits (for example, padded NACK bits) for the instance of DCI in the HARQ codebook, which may result in inefficient utilization of communication resources.

To improve various aspects of wireless communications, a UE may be configured to use allocated feedback resources that may be otherwise associated with padded feedback bits in the HARQ codebook for additional reporting bits (for example, replacing padded feedback bits with additional reporting bits). For example, if the HARQ codebook includes at least one ACK bit and one or more padded NACK bits corresponding to the instance of DCI, the UE may replace (for example, reallocate) one or more padded NACK bits with additional reporting bits. If the UE is unable to receive (for example, is unable to decode) the instance of DCI, or if the UE unsuccessfully receives or decodes each TB or CBG scheduled by the instance of DCI, the UE may maintain the padded NACK bits in the HARQ codebook. In various implementations, additional reporting bits may indicate one or more of a power headroom (PH) value, a modulation and coding scheme (MCS), a preferred beam configuration, or a maximum permissible exposure (MPE) value.

Particular implementations of the subject matter described in this disclosure can be implemented to realize one or more of the following potential advantages. In some implementations, replacing padded feedback bits with additional reporting bits may improve utilization of communication resources, or improve uplink control signaling, or both. For example, the UE may include additional reporting bits in the resources originally allocated for the HARQ codebook that may be otherwise unused for reporting meaningful information, which may reduce or eliminate some amount of wasted communications resources. In some implementations, such techniques may support improved control signaling with the network, such as providing additional resources for signaling downlink transmission characteristics preferred or requested by the UE, for signaling signal propagation or noise conditions local to the UE, or for signaling of capabilities or limitations of the UE, among other signaling. Additionally, or alternatively, such techniques may allow the UE to proactively report more information for improving communications without an allocation of dedicated reporting resources.

FIG. 1 illustrates an example of a wireless communications system 100 that supports reallocation of padded acknowledgment resources. The wireless communications system 100 may include one or more BSs 105, one or more UEs 115, and a core network 130. In some implementations, the wireless communications system 100 may be a Long Term Evolution (LTE) network, an LTE-Advanced (LTE-A) network, an LTE-A Pro network, or a New Radio (NR) network. In some implementations, the wireless communications system 100 may support enhanced broadband communications, ultra-reliable (for example, mission critical) communications, low latency communications, communications with low-cost and low-complexity devices, or any combination thereof.

The BSs 105 may be dispersed throughout a geographic area to form the wireless communications system 100 and may be devices in different forms or having different capabilities. The BSs 105 and the UEs 115 may wirelessly communicate via one or more communication links 125. Each BS 105 may provide a coverage area 110 over which the UEs 115 and the BS 105 may establish one or more communication links 125. The coverage area 110 may be an example of a geographic area over which a BS 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the BSs 105, or network equipment (for example, core network nodes, relay devices, integrated access and backhaul (IAB) nodes, or other network equipment), as shown in FIG. 1.

The BSs 105 may communicate with the core network 130, or with one another, or both. For example, the BSs 105 may interface with the core network 130 through one or more backhaul links 120 (for example, via an S1, N2, N3, or another interface). The BSs 105 may communicate with one another over the backhaul links 120 (for example, via an X2, Xn, or another interface) either directly (for example, directly between BSs 105), or indirectly (for example, via core network 130), or both. In some implementations, the backhaul links 120 may be or include one or more wireless links.

One or more of the BSs 105 described herein may include or may be referred to by a person having ordinary skill in the art as a base transceiver station, a radio BS, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" also may be referred to as a unit, a station, a terminal, or a client, among other implementations. A UE 115 also may include or may be referred to as a personal electronic device such as a cellular phone, a personal digital assistant (PDA), a tablet computer, a laptop computer, or a personal computer. In some implementations, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other implementations.

The UEs 115 described herein may be able to communicate with various types of devices, such as other UEs 115 that may sometimes act as relays as well as the BSs 105 and the network equipment including macro eNBs or gNBs, small cell eNBs or gNBs, or relay BSs, among other implementations, as shown in FIG. 1.

The UEs 115 and the BSs 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (for example, a bandwidth part (BWP)) that is operated according to one or more physical layer channels for a given radio access technology (for example, LTE, LTE-A, LTE-A Pro, NR). Each physical layer channel may carry acquisition signaling (for example, synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

The communication links 125 shown in the wireless communications system 100 may include uplink transmissions from a UE 115 to a BS 105, or downlink transmissions from a BS 105 to a UE 115. Carriers may carry downlink or uplink communications (for example, in an FDD mode) or may be configured to carry downlink and uplink communications (for example, in a TDD mode).

Signal waveforms transmitted over a carrier may be made up of multiple subcarriers (for example, using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (for example, a duration of one modulation symbol) and one subcarrier, where the symbol period and subcarrier spacing are inversely related. The quantity of bits carried by each resource element may depend on the modulation scheme (for example, the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (for example, spatial layers or beams), and the use of multiple spatial layers may further increase the data rate or data integrity for communications with a UE 115.

The time intervals for the BSs 105 or the UEs 115 may be expressed in multiples of a basic time unit which may, for example, refer to a sampling period of $T_s = 1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (for example, 10 milliseconds (ms)). Each radio frame may be identified by a system frame number (SFN) (for example, ranging from 0 to 1023).

A frame may include multiple consecutively numbered subframes or slots, and each subframe or slot may have the same duration. In some implementations, a frame may be divided (for example, in the time domain) into subframes, and each subframe may be further divided into a quantity of slots. Alternatively, each frame may include a variable quantity of slots, and the quantity of slots may depend on subcarrier spacing. Each slot may include a quantity of symbol periods (for example, depending on the length of the cyclic prefix prepended to each symbol period). In some wireless communications systems 100, a slot may further be divided into multiple mini-slots containing one or more symbols. Excluding the cyclic prefix, each symbol period may contain one or more (for example, $N_f$) sampling periods. The duration of a symbol period may depend on the subcarrier spacing or frequency band of operation.

A subframe, a slot, a mini-slot, or a symbol may be the smallest scheduling unit (for example, in the time domain) of the wireless communications system 100 and may be referred to as a transmission time interval (TTI). In some implementations, the TTI duration (for example, the quantity of symbol periods in a TTI) may be variable. Additionally, or alternatively, the smallest scheduling unit of the wireless communications system 100 may be dynamically selected (for example, in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (for example, a control resource set (CORESET)) for a physical control channel may be defined by a quantity of symbol periods and may extend across the system bandwidth or a subset of the system bandwidth of the carrier. One or more control regions (for example, CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a quantity of control channel resources (for example, control channel elements (CCEs)) associated with encoded information for a control information format having a given payload size. Search space sets may include common search space sets configured for sending control information to multiple UEs 115 and UE-specific search space sets for sending control information to a specific UE 115.

In some implementations, a BS 105 may be movable and therefore provide communication coverage for a moving geographic coverage area 110. In some implementations, different geographic coverage areas 110 associated with different technologies may overlap, but the different geographic coverage areas 110 may be supported by the same BS 105. In some other implementations, the overlapping geographic coverage areas 110 associated with different technologies may be supported by different BSs 105. The wireless communications system 100 may include, for example, a heterogeneous network in which different types of the BSs 105 provide coverage for various geographic coverage areas 110 using the same or different radio access technologies.

Some wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (for example, mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some implementations, a UE 115 also may be able to communicate directly with other UEs 115 over a device-to-device (D2D) communication link 135 (for example, using a peer-to-peer (P2P) or D2D protocol). One or more UEs 115 utilizing D2D communications may be within the geographic coverage area 110 of a BS 105. Other UEs 115 in such a group may be outside the geographic coverage area 110 of a BS 105 or be otherwise unable to receive transmissions from a BS 105. In some implementations, groups of the UEs 115 communicating via D2D communications may utilize a one-to-many (1:M) system in which each UE 115 transmits to every other UE 115 in the group. In some implementations, a BS 105 facilitates the scheduling of resources for D2D communications. In some other implementations, D2D communications are carried out between the UEs 115 without the involvement of a BS 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (for example, a mobility management entity (MME), an access and mobility management function (AMF)) and at least one user plane entity that routes packets or interconnects to external networks (for example, a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the BSs 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a BS 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or BS 105 may be distributed across various network devices (for example, radio heads and ANCs) or consolidated into a single network device (for example, a BS 105). In various implementations, a BS 105, or an access network entity 140, or a core network 130, or some subcomponent thereof, may be referred to as a network entity.

As described herein, a BS 105 may include components that are located at a single physical location or components located at various physical locations. In examples in which the BS 105 includes components that are located at various physical locations, the various components may each perform various functions such that, collectively, the various components achieve functionality that is similar to a BS 105 that is located at a single physical location. As such, a BS 105 described herein may equivalently refer to a standalone BS 105 or a BS 105 including components that are located at various physical locations. In some implementations, such a BS 105 including components that are located at various physical locations may be referred to as or may be associated with a disaggregated radio access network (RAN) architecture, such as an Open RAN (O-RAN) or Virtualized RAN (VRAN) architecture.

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (for example, less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the BSs 105 and the UEs 115 may employ carrier sensing for collision detection and avoidance. In some implementations, operations in unlicensed bands may be based on a carrier aggregation configuration in conjunction with component carriers operating in a licensed band (for example, LAA). Operations in unlicensed spectrum may include downlink transmissions, uplink transmissions, P2P transmissions, or D2D transmissions, among other transmissions.

A BS 105 or a UE 115 may be equipped with multiple antennas, which may be used to employ techniques such as transmit diversity, receive diversity, multiple-input multiple-output (MIMO) communications, or beamforming. The antennas of a BS 105 or a UE 115 may be located within one or more antenna arrays or antenna panels, which may support MIMO operations or transmit or receive beamforming. For example, one or more BS antennas or antenna arrays may be co-located at an antenna assembly, such as an antenna tower. In some implementations, antennas or antenna arrays associated with a BS 105 may be located in diverse geographic locations. A BS 105 may have an antenna array with a quantity of rows and columns of antenna ports that the BS 105 may use to support beamforming of communications with a UE 115. Likewise, a UE 115 may have one or more antenna arrays that may support various MIMO or beamforming operations. Additionally, or alternatively, an antenna panel may support radio frequency beamforming for a signal transmitted via an antenna port.

Beamforming, which also may be referred to as spatial filtering, directional transmission, or directional reception, is a signal processing technique that may be used at a transmitting device or a receiving device (for example, a BS 105, a UE 115) to shape or steer an antenna beam (for example, a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (for example, with respect to the antenna array of the transmitting device or receiving device, or with respect to some other orientation).

The UEs 115 and the BSs 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (for example, using a cyclic redundancy check (CRC)), forward error correction (FEC), and retransmission (for example, automatic repeat request (ARQ)). HARQ may improve throughput at the medium access control (MAC) layer in poor radio conditions (for example, low signal-to-noise conditions). In some implementations, a device may support same-slot HARQ feedback, where the device may provide HARQ feedback in a specific slot for data received in a previous symbol in the slot. In some other implementations, the device may provide HARQ feedback in a subsequent slot, or according to some other time interval.

In some implementations of the wireless communications system 100, an instance of DCI, such as a downlink grant, may be configured to schedule up to a first quantity of TBs or CBGs (for example, a configured quantity of scheduling units, such as N TBs or N CBGs,). For example, in accordance with some communications standards or configurations, one instance of DCI may schedule up to two TBs (for example, in a space division multiplexing manner), and a maximum quantity of CBGs may be greater than two. In some implementations, a UE 115 may be configured to include a corresponding quantity of acknowledgment feedback bits (for example, N bits) for the instance of DCI in a HARQ codebook (for example, in an instance of UCI). In some implementations, the first quantity may be associated with an allocation of resources for acknowledgment feedback, which may be based on a radio resource control (RRC) configuration or other configuration of the UE 115, and the HARQ codebook may be scaled by the first quantity (for example, as a product of the first quantity, N, and a quantity of instances of DCI or a quantity of downlink grants being responded to by an instance of the HARQ codebook). If the UE 115 successfully receives the instance of DCI, and the instance of DCI schedules a second quantity of TBs or CBGs (for example, n TBs or n CBGs) that is less than the first quantity of TBs or CBGs, the UE 115 may be configured to include the second quantity of feedback bits (for example, as ACK bits or NACK bits) and a third quantity (for example, N−n) of padded NACK bits in the HARQ codebook. If an instance of DCI is lost (for example, if the UE 115 is unable to receive or decode the instance of DCI), the UE 115 may be unable to determine how many TBs or CBGs were scheduled by the instance of DCI, and may accordingly include NACK bits (for example, padding NACK bits) for all of the bits of the HARQ codebook associated with the lost DCI.

In some implementations, an instance of DCI may schedule up to N TBs. For each HARQ-ACK information bit (for example, for each TB), the UE 115 may generate an ACK bit (for example, a bit value of 1, a positive acknowledgment) in the HARQ codebook if the UE 115 detects a DCI format that provides a semi persistent scheduling (SPS) physical downlink shared channel (PDSCH) release, or if the UE 115 correctly decodes the TB, or the UE 115 may generate a NACK bit (for example, a bit value of 0, a negative acknowledgment) in the HARQ codebook if the UE 115 does not correctly decode the TB.

In some implementations, an instance of DCI may schedule a TB having multiple CBGs. For example, if the UE 115 is provided with a first parameter (for example, PDSCH-CodeBlockGroupTransmission) for a serving cell, the UE 115 may receive a PDSCH scheduled by DCI format 1_1 that includes CBGs of a TB. The UE 115 also may be provided with a second parameter (for example, maxCode-BlockGroupsPerTransportBlock) indicating a maximum quantity of CBGs for generating respective HARQ-ACK information bits for a TB reception for the serving cell. In some implementations, the HARQ codebook may include a quantity (for example, $$N_{HARQ-ACK}^{CBG,TB,max})$$

of HARQ information bits corresponding to a TB. If, for example, a quantity of CBGs in a given TB (for example, $$N_{HARQ-ACK}^{CBG,TB,max})$$

is less than the quantity of HARQ information bits corresponding to the TB, the UE 115 may generate NACK values for any remaining bits (for example, the last $$N_{HARQ-ACK}^{CBG,TB,max} - N_{HARQ-ACK}^{CBG,TB}$$

bits corresponding to the TB) in the HARQ codebook. In some implementations, these NACK values may be referred to as padding NACK bits, and may not be associated with meaningful information.

To improve various aspects of wireless communications, a UE 115 may be configured to use feedback resources that may be otherwise associated with padded feedback bits in the HARQ codebook for additional reporting bits (for example, replacing padded feedback bits with additional reporting bits). For example, if the HARQ codebook includes at least one ACK bit and one or more padded NACK bits corresponding to the instance of DCI, the UE 115 may replace (for example, reallocate) the one or more padded NACK bits with additional reporting bits. If the UE 115 is unable to receive (for example, is unable to decode) an instance of DCI, or if the UE unsuccessfully receives or decodes each TB or CBG scheduled by the instance of DCI, the UE 115 may maintain the padded NACK bits in the HARQ codebook. In various implementations, additional reporting bits may indicate one or more of a PH value, an MCS (for example, a preferred or requested MCS), a beam configuration (for example, a preferred or requested beam index), or an MPE value, among other signaling.

Figure 2:
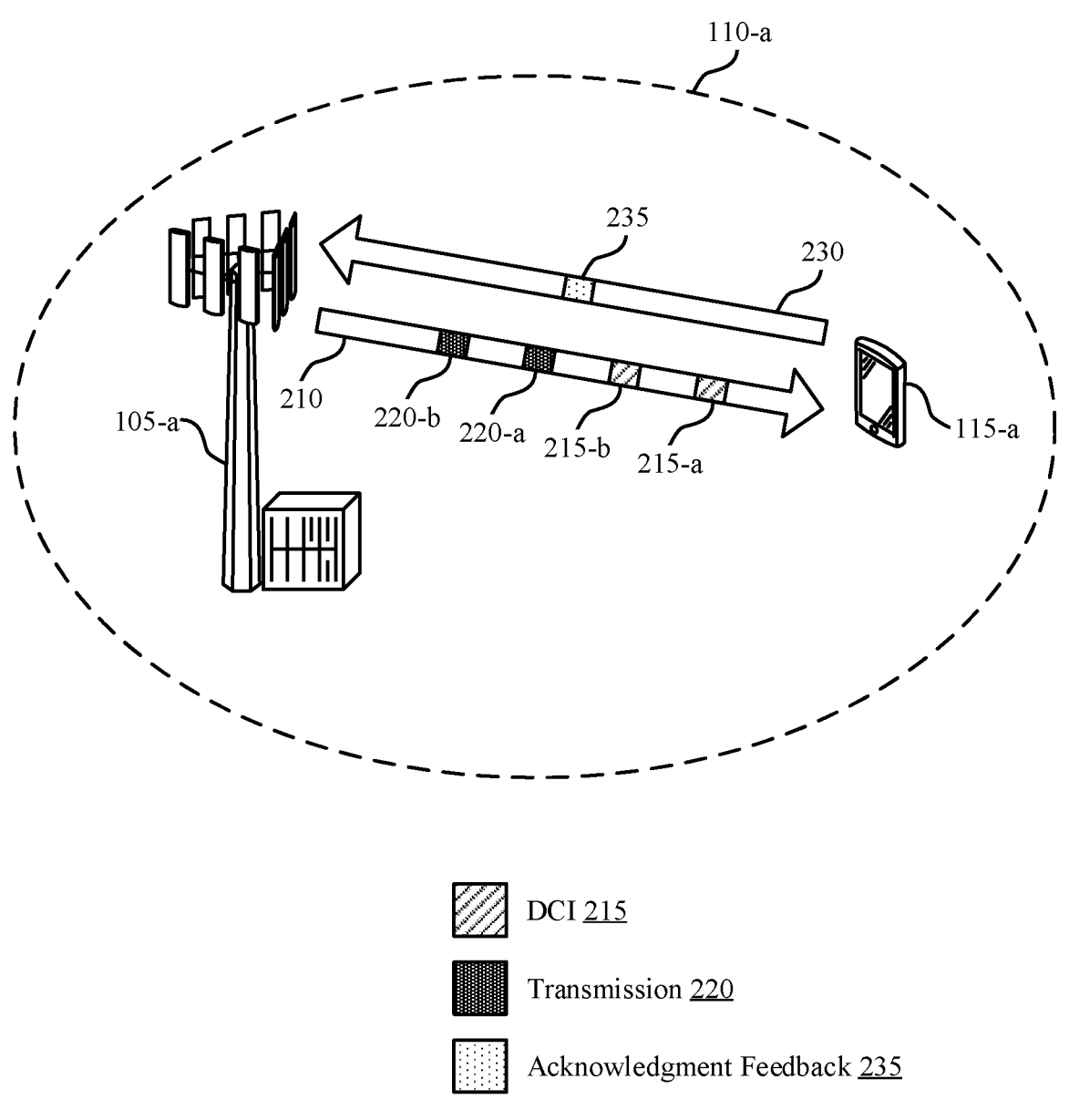
FIG. 2 illustrates an example of a signaling diagram that supports reallocation of padded acknowledgment resources.

FIG. 2 illustrates an example of a signaling diagram 200 that supports reallocation of padded acknowledgment resources. The signaling diagram 200 may implement or be implemented to realize aspects of the wireless communications system 100. For example, the signaling diagram 200 may illustrate communications between one or more components of a BS 105-*a* (for example, a network entity) and a UE 115-*a*, which may be examples of corresponding devices described herein, including with reference to FIG. 1. In some implementations, the UE 115-*a* may be an example of a sidelink device or a sidelink node (for example, as a relay device performing sidelink communications, as an endpoint device performing sidelink communications). For example, as a relay device, the UE 115-*a* may communicate with a second UE 115 (not shown) over a sidelink connection, and may relay communications between the BS 105-*a* and the second UE 115. Additionally, or alternatively, as an endpoint device, the UE 115-*a* may be configured to communicate with the base station 105-*a* using communications that are relayed via a second UE 115 (not shown). The UE 115-*a* and the BS 105-*a* may communicate in a geographic coverage area 110-*a*, which may be an example of a geographic coverage area 110 described herein, including with reference to FIG. 1.

In the example of the signaling diagram 200, one or more components of the BS 105-*a* may transmit downlink communications 210 to the UE 115-*a*, which may include various implementations of control signaling, data or payload signaling, or various combinations thereof. For example, the downlink communications 210 may include one or more instances of DCI 215 (for example, control information, a downlink control transmission), which may be carried via one or more instances of a physical downlink control channel (PDCCH) or some other control channel. Each instance of DCI 215 may schedule a respective transmission 220 (for example, a downlink data transmission, a downlink payload transmission), which may be carried via one or more instances of a PDSCH or some other data channel. For example, the DCI 215-*a* may schedule the transmission 220-*a*, and the DCI 215-*b* may schedule the transmission 220-*b*. In various implementations, a transmission 220 may refer to or otherwise include some quantity of TBs, some quantity of CGBs, or both. Although the example of signaling diagram 200 illustrates two instances of DCI 215 and two corresponding instances of transmissions 220, the techniques described herein may be implemented to support any quantity of one or more DCI 215 and corresponding transmissions 220.

In the example of the signaling diagram 200, one or more components of the UE 115-*a* may be configured to transmit uplink communications 230 to the BS 105-*a*, which may include various implementations of control signaling, data or payload signaling, or various combinations thereof. For example, the uplink communications 230 may include acknowledgment feedback 235 (for example, HARQ feedback), which may be carried via one or more instances of a physical uplink control channel (PUCCH), a physical uplink shared channel (PUSCH), or portions thereof (for example, in one or more instances of UCI). The acknowledgment feedback 235 may be transmitted in response to the DCI 215, or the transmissions 220, or both, and may include a HARQ codebook generated based at least in part on one or more aspects of the downlink communications 210.

An instance of DCI 205, and a corresponding transmission 220, may be associated with a configured quantity of scheduling units (for example, a maximum quantity of scheduling units), such as a configured quantity of TBs, or a configured quantity of CBGs per TB, among other implementations. In some implementations, a configured quantity of scheduling units may be related to a size of the HARQ codebook. In some implementations, each scheduling unit may be associated with a bit of feedback in an instance of acknowledgment feedback 235, such that the configured quantity of scheduling units is implicitly or explicitly associated with a corresponding allocation of feedback resources for acknowledgment feedback. The configured quantity of scheduling units, and associated allocation of feedback, may be a fixed, persistent, or semi-persistent configuration, or some other configuration that is not signaled with each instance of DCI 215. For example, an implicit or explicit allocation of resources for acknowledgment feedback may be signaled by the BS 105-*a* during or after establishment of a communications link (for example, using RRC signaling, using signaling of a MAC control element (CE)). In some implementations, such techniques may reduce control signaling or processing overhead compared to implementations that explicitly signal size of a particular transmission 220 or an allocation of feedback resources with each instance of DCI 215, or otherwise signal dynamic changes in size of downlink communications 210 more often. In some implementations, however, an instance of DCI 215 may schedule fewer than the configured quantity of scheduling units. For example, an instance of DCI 215 may schedule a transmission 220 with fewer than a configured quantity of TBs or CBGs, such as when the BS 105-*a* or the UE 115-*a* is experiencing poor channel conditions (for example, poor signal propagation conditions, noisy channel conditions), or when one or more transmissions 220 include URLLC traffic, among other scenarios.

In some implementations, the UE 115-*a* may generate a HARQ codebook according to a configured quantity of scheduling units (for example, including a quantity of feedback bits equal to the configured quantity of scheduling units) even if an instance of DCI 205 schedules fewer than the configured quantity of scheduling units. For example, if each instance of DCI 205 supports scheduling of up to two TBs, but the DCI 215-*a* schedules one TB (for example, where the transmission 220-*a* includes one TB), the UE 115-*a* may still include two HARQ information bits or positions responsive to or otherwise associated with the DCI 215-*a* or the transmission 220-*a* in the HARQ codebook. The first HARQ information bit for the DCI 215-*a* may be an ACK bit or a NACK bit corresponding to the single TB of the transmission 220-*a*, and the second HARQ information bit for the DCI 215-*a* may be a padding NACK bit. Including padding NACK bits in the HARQ codebook may enable the UE 115-*a* to mitigate DCI misdetection issues. That is, padding NACKs may ensure that a HARQ codebook size is consistent even with a DCI misdetection. However, including padding NACK bits in the HARQ codebook may underutilize communication resources since the HARQ codebook size may be preconfigured rather than being based on a number of scheduling units scheduled by an instance of DCI. To improve various aspects of wireless communications, the UE 115-*a* may be configured to use allocated feedback resources that may be otherwise associated with padded feedback bits in the HARQ codebook for additional reporting bits (for example, replacing padded feedback bits of the resources allocated to the acknowledgment feedback 235 with additional reporting bits). For example, the UE 115-*a* may replace or reallocate one or more padding NACK bits with additional reporting bits, which may utilize a portion of an allocation of resources for acknowledgment feedback that would otherwise be unused for meaningful signaling.

In some implementations, the UE 115-*a* and the BS 105-*a* may be configured for communicating a preferred MCS using additional reporting bits of the acknowledgment feedback 235. For example, the UE 115-*a* may use one or more additional reporting bits to report or indicate a requested or preferred MCS to the BS 105-*a*, which may be a delta MCS from a current MCS of a TB of a transmission 220. In some implementations, the BS 105-*a* may receive such an indication and apply or evaluate such a request for one or more subsequent transmissions 220 (for example, using an MCS for a next PDSCH scheduling that is selected by the BS 105-*a* based on the MCS indication or request from the UE 115-*a* in the additional reporting bits of the acknowledgment feedback 235).

In some implementations, the UE 115-*a* and the BS 105-*a* may be configured for communicating a preferred beam using additional reporting bits of the acknowledgment feedback 235. For example, the UE 115-*a* may use one or more additional reporting bits to report or indicate a requested downlink transmission configuration indicator (TCI) (for example, a unified TCI state indicator providing quasi-colocation information or spatial filter information for at least one channel or signal), a synchronization signal block (SSB) index, or a channel state information (CSI) resource index, for beam tracking. In some implementations, the BS 105-*a* may receive such an indication and apply or evaluate such a request for one or more subsequent transmissions 220 (for example, using a beam for a next PDSCH scheduling that is selected by the BS 105-*a* based on the beam indication or request from the UE 115-*a* in the additional reporting bits of the acknowledgment feedback 235).

In some implementations, the UE 115-*a* and the BS 105-*a* may be configured for communicating an MPE value using additional reporting bits of the acknowledgment feedback 235. For example, the UE 115-*a* may determine an MPE value that may limit a transmission power at the UE 115-*a*, and the UE 115-*a* may use one or more additional reporting bits to report or indicate the MPE or otherwise indicate a maximum transmission power or other signal power limitation (for example, indicating an MPE value suffered by a PUCCH carrying a HARQ-ACK codebook). In some implementations, such techniques may improve other types of reporting, such as MPE reporting that is otherwise carried in a MAC-CE of a PUSCH, and may not be carried on a UCI of a PUCCH. In some implementations, the BS 105-*a* may receive such an indication and apply or evaluate such an indication for scheduling or configuration of subsequent uplink communications 230 (for example, scheduling uplink communications 230 with a transmission power selected by the BS 105-*a* based on the MPE indication from the UE 115-*a* in the additional reporting bits of the acknowledgment feedback 235, scheduling uplink communications 230 with an MCS or transmission redundancy that is selected by the BS 105-*a* based on the MPE indication from the UE 115-*a* in the additional reporting bits of the acknowledgment feedback 235).

In some implementations, the UE 115-*a* and the BS 105-*a* may be configured for communicating a PH value using additional reporting bits of the acknowledgment feedback 235. For example, the UE 115-*a* may determine a PH value that is associated with an amount of additional transmission power available at the UE 115-*a*, which may be determined relative to a transmission power capability of the UE 115-*a*. The UE 115-*a* may use one or more additional reporting bits to report or indicate the PH or otherwise indicate a further capability for increasing transmission power (for example, indicating a PH value suffered by a PUCCH carrying a HARQ-ACK codebook). In some implementations, such techniques may improve other types of reporting, such as PH reporting that is otherwise carried in a MAC-CE of a PUSCH, and may not be carried on a PUCCH. In some implementations, the BS 105-*a* may receive such an indication and apply or evaluate such an indication for scheduling or configuration of subsequent uplink communications 230 (for example, scheduling uplink communications 230 with a transmission power selected by the BS 105-*a* based on the PH indication from the UE 115-*a* in the additional reporting bits of the acknowledgment feedback 235, scheduling uplink communications 230 with an MCS or transmission redundancy that is selected by the BS 105-*a* based on the PH indication from the UE 115-*a* in the additional reporting bits of the acknowledgment feedback 235).

Thus, according to these and other implementations, at least a portion of resources allocated for acknowledgment feedback may be reallocated to additional reporting bits, such as when an instance of DCI 215 schedules a transmission 220 with less than a configured quantity of scheduling units, which may support improved control signaling between the UE 115-*a* and the BS 105-*a*. For example, such additional reporting bits may support additional resources for signaling downlink transmission characteristics preferred or requested by the UE 115-*a*, for signaling signal propagation or noise conditions local to the UE 115-*a*, or for signaling of capabilities or limitations of the UE 115-*a*, among other signaling. In some implementations, the BS 105-*a* may be configured to command or request which information the additional reporting bits should indicate, which may be indicated to the UE 115-*a* via various implementations of control or configuration signaling. In some implementations, the UE 115-*a* may accordingly generate the additional reporting based at least in part on such signaling.

Figure 3:
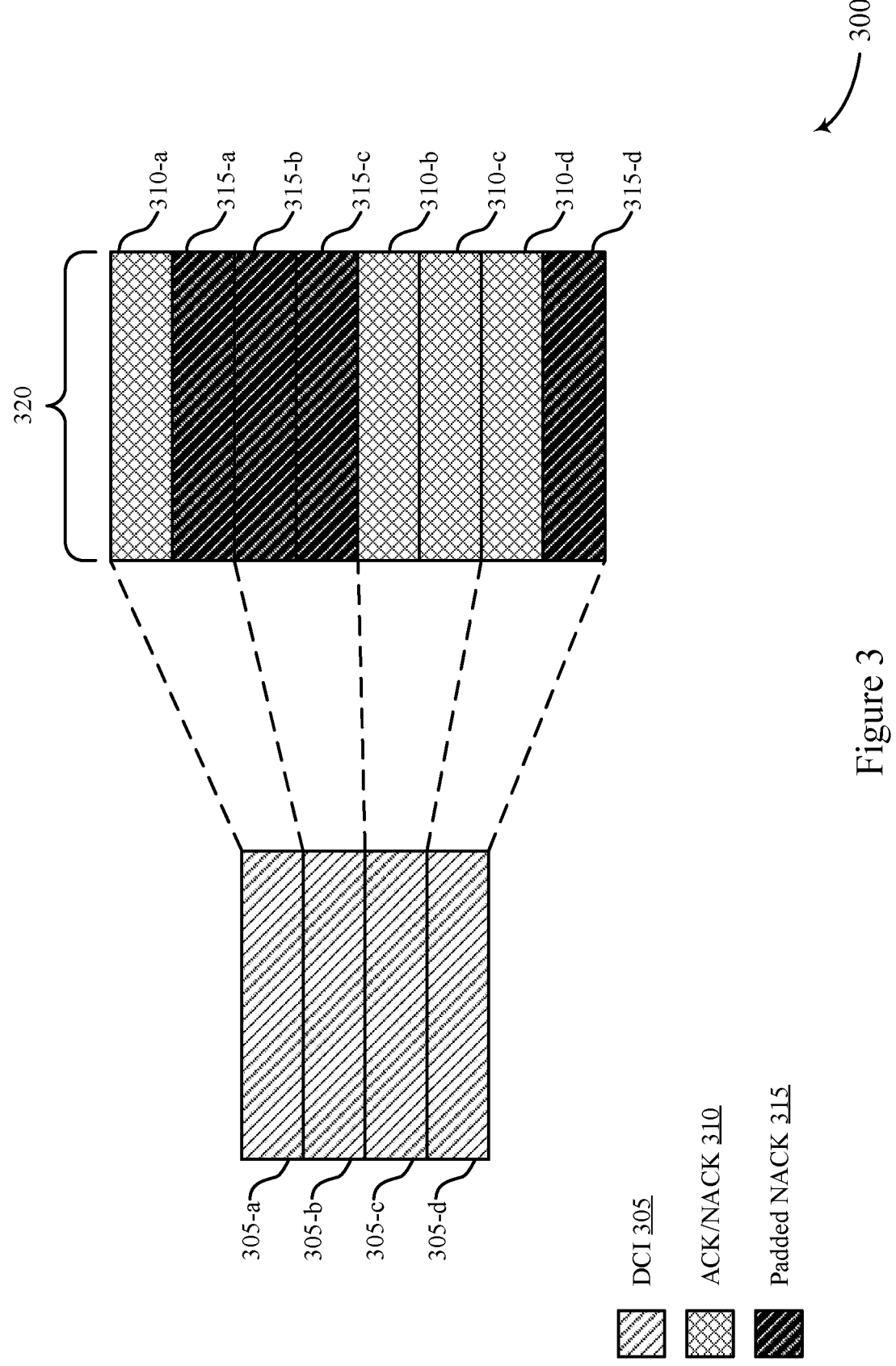
FIG. 3 illustrates an example of a resource map that supports reallocation of padded acknowledgment resources.

FIG. 3 illustrates an example of a signaling map 300 that supports reallocation of padded acknowledgment resources. The signaling map 300 may implement or be implemented to realize aspects of the wireless communications system 100, the signaling diagram 200, or both. For example, the signaling map 300 may be implemented by a UE 115 and one or more components of a BS 105, which may be examples of corresponding devices described herein, including with reference to FIGS. 1 and 2.

In the example of signaling map 300, the one or more components of the BS 105 may transmit instances of DCI 305 (for example, DCI 305-*a* through DCI 305-*d*, which may be carried in downlink communications 210), which may be received by a UE 115. Each instance of DCI 305 may schedule a transmission from the BS 105 to the UE 115 (for example, a transmission 220), which may each include a respective quantity of scheduling units (for example, n TBs or n CBGs). The UE 115 may be configured to generate a HARQ codebook 320 responsive to the scheduled transmissions, which may include ACK or NACK bits 310 corresponding to the scheduled downlink transmissions, and also may include padded NACK bits 315. In some implementations, the HARQ codebook 320 may be included in an instance of acknowledgment feedback 235.

In the example of signaling map 300, each instance of DCI 305 may schedule up to two scheduling units (for example, two TBs or CBGs, where N=2). Accordingly, the HARQ codebook 320 may be configured to include two bits for each instance of DCI 305, even if some instances of DCI 305 schedule fewer than the configured quantity of scheduling units. If an instance of DCI 305 schedules fewer than the configured quantity of scheduling units, the HARQ codebook 320 may include one or more padded NACK bits 315 corresponding to the instance of DCI 305. For example, an instance of DCI 305-*a* may schedule one scheduling unit (for example, one TB or one CBG), and the portion of the HARQ codebook 320 corresponding to the instance of DCI 305-*a* may include an ACK or NACK bit 310-*a* (for example, to indicate whether the UE 115 successfully decoded the one scheduling unit) and a padded NACK bit 315-*a*. Likewise, an instance of DCI 305-*d* may schedule one scheduling unit, and the portion of the HARQ codebook 320 corresponding to the instance of DCI 305-*d* may include an ACK or NACK bit 310-*d* and a padded NACK bit 315-*d*. However, an instance of DCI 305-*c* may schedule two scheduling units (for example, two TBs or two CBGs), and the portion of the HARQ codebook 320 corresponding to the instance of DCI 305-*c* may include two ACK or NACK bits 310-*b* and 310-*c*.

In some implementations, the UE 115 may be unable to successfully decode a particular instance of DCI 305 and, accordingly, may be unable to determine how many scheduling units were scheduled by the instance of DCI 305-*b*. In such circumstances, the UE 115 may include a padded NACK bit 315 for each bit of the HARQ codebook 320 corresponding to the unsuccessfully decoded instance of DCI 305. In the example of signaling map 300, the UE 115 may be unable to successfully decode an instance of DCI 305-*b*, and thus may include padded NACK bits 315-*b* and 315-*c* in the positions of the HARQ codebook 320 corresponding to the instance of DCI 305-*b*. In some implementations, the BS 105 that receives the HARQ codebook 320 may interpret the padded NACK bits 315-*b* and 315-*c* (for example, padded NACK bits 315 in each position of the HARQ codebook 320 corresponding to the instance of DCI 305-*b*) as an indication that the UE 115 was unable to successfully decode the instance of DCI 305-*b*.

To improve various aspects of wireless communications, the UE 115 may replace padded NACK bits 315, or otherwise reallocate acknowledgment feedback resources that would be associated with padded NACK bits 315, with additional reporting bits, which may utilize a portion of an allocation of resources for acknowledgment feedback that would otherwise be unused for meaningful signaling. For example, one or more of the bits or positions of the HARQ codebook 320 that are associated with padded NACK bits 315 may be reallocated to the signaling of a preferred MCS, a preferred beam, an MPE value, or a PH value, among other uplink signaling by the UE 115.

Figures 4A, 4B:
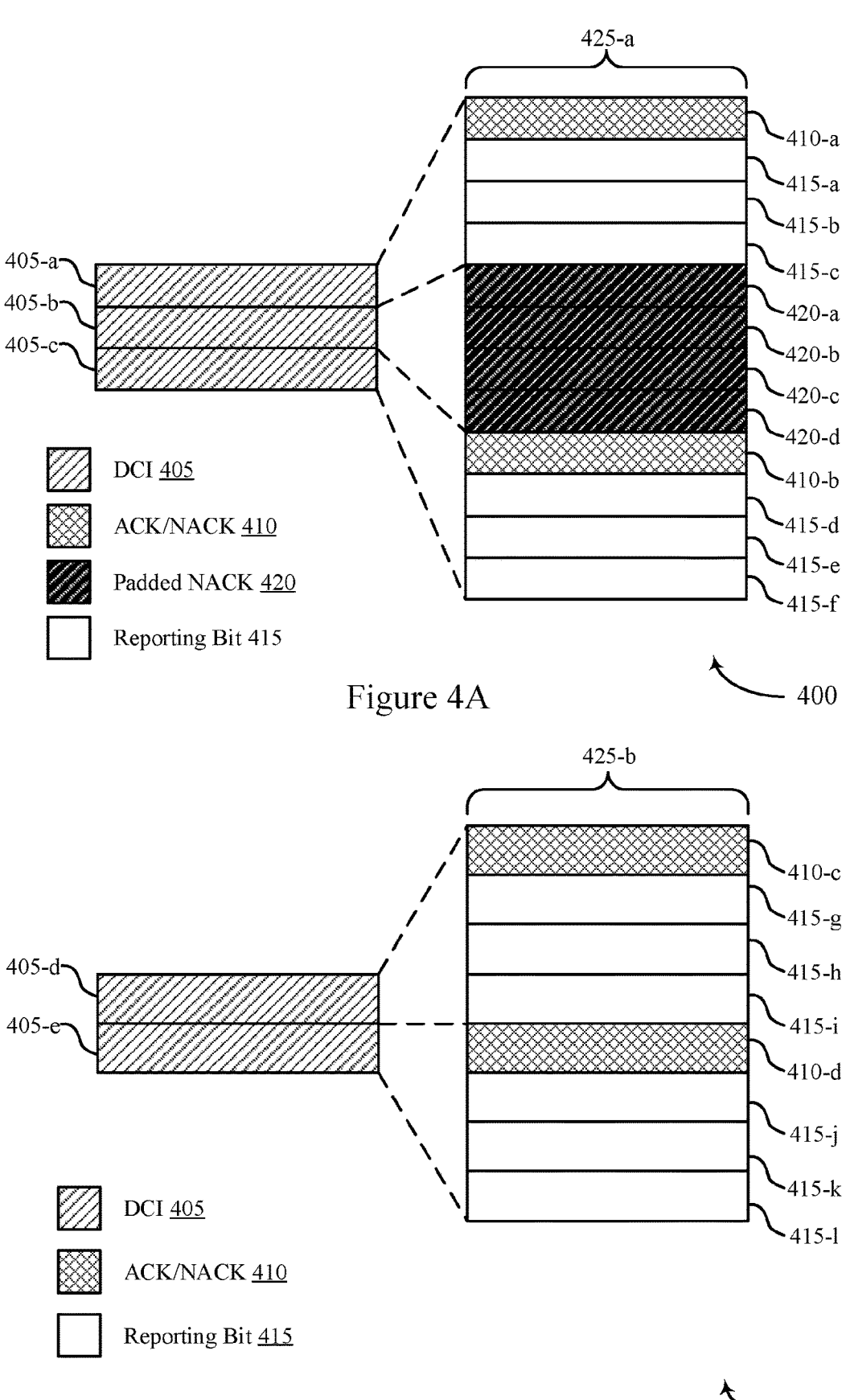
FIGS. 4A and 4B illustrate examples of resource maps that support reallocation of padded acknowledgment resources.

FIGS. 4A and 4B illustrate examples of a signaling map 400 and a signaling map 401 that support reallocation of padded acknowledgment resources. The signaling map 400 and the signaling map 401 may implement or be implemented to realize aspects of the wireless communications system 100, the signaling diagram 200, the signaling map 300, or a combination thereof. For example, the signaling map 400 and the signaling map 401 may be implemented by a UE 115 and one or more components of a BS 105, which may be examples of corresponding devices described herein, including with reference to FIGS. 1-3.

The signaling map 400 and the signaling map 401 illustrate examples where the UE 115 may avoid some instances of padded NACK 420 by reallocating certain resources of a HARQ codebook 425 (for example, certain bits or positions of the HARQ codebook 425) to reporting bits 415. For example, when a HARQ codebook 425 includes one or more bits or positions that are not associated with a scheduling unit of an instance of DCI 405 (for example, when the instance of DCI 405 schedules fewer than a configured or maximum quantity of scheduling units), the UE 115 may reallocate some acknowledgment feedback resources associated with the DCI 405 to reporting bits 415 for additional reporting.

In the example of signaling map 400, the one or more components of the BS 105 may transmit an instance of DCI 405-*a*, an instance of DCI 405-*b*, and an instance of DCI 405-*c* to a UE 115. Each instance of DCI 405-*a* through 405-*c* may be configured for scheduling up to four scheduling units (for example, four TBs or CBGs). The UE 115 may be configured (for example, by the BS 105) to generate a HARQ codebook 425-*a* to include four bits for each instance of DCI 405 (for example, in accordance with an allocation of resources for acknowledgment feedback), even if an instance of DCI 405 schedules fewer than four scheduling units, where each of the four bits may correspond to an ACK or NACK bit 410, a reporting bit 415, or a padded NACK bit 420. For example, if the UE 115 successfully decodes an instance of DCI 405, and the instance of DCI 405 schedules four scheduling units, the HARQ codebook 425-*a* may include four ACK or NACK bits 410 corresponding to the instance of DCI 405. Alternatively, if the UE 115 successfully decodes an instance of DCI 405, and the instance of DCI 405 schedules fewer than four scheduling units, the HARQ codebook 425-*a* may include a quantity of ACK or NACK bits 410 and a quantity of reporting bits 415 corresponding to the instance of DCI 405.

In an example implementation, when the instance of DCI 405-*a* schedules one scheduling unit, and the UE 115 successfully decodes or otherwise receives the one scheduling unit, the acknowledgment feedback resources allocated for the instance of DCI 405-*a* may include one ACK bit 410-*a* (for example, to indicate that the UE 115 successfully decoded the scheduling unit) and three reporting bits 415-*a*, 415-*b*, and 415-*c*. In another example implementation, when the instance of DCI 405-*c* schedules one scheduling unit, and the UE 115 successfully decodes or otherwise receives the one scheduling unit, the acknowledgment feedback resources allocated for the instance of DCI 405-*c* may include one ACK bit 410-*b* (for example, to indicate that the UE 115 successfully decoded the scheduling unit) and three reporting bits 415-*d*, 415-*e*, and 415-*f* In another example implementation, if the UE 115 is unable to decode an instance of DCI 405-*b*, the HARQ codebook 425-*a* may include a padded NACK bits 420-*a* through 420-*d* corresponding to the instance of DCI 405-*b* (for example, to indicate that the UE 115 was unable to decode the instance of DCI 405-*b*).

In various implementations, any one or more of the reporting bits 415-*a* through 415-*f*, or various combinations thereof, may support indicating one or more of a requested MCS, a requested beam index, an MPE value, or a PH value, among other signaling. In some implementations, the UE 115 may jointly report additional control information using reporting bits 415 that correspond to different instances of DCI 405. For example, the reporting bits 415-*a*, 415-*b*, and 415-*c*, corresponding to DCI 405-*a*, may indicate a first portion of additional control information, and the reporting bits 415-*d*, 415-*e* and 415-*f*, corresponding to DCI 405-*c*, may indicate a second portion of the additional control information. In one implementation, additional control information may be communicated via a bit sequence having six bits (for example, a 6-bit report for a PH value), where the reporting bits 415-*a* though 415-*c* may correspond to the first three bits of the bit sequence and the reporting bits 415-*d* through 415-*f* may correspond to the last three bits of the bit sequence.

In the example of signaling map 401, a BS 105 may transmit an instance of DCI 405-*d* and an instance of DCI 405-*e* to a UE 115. Each instance of DCI 405-*d* and 405-*e* may be configured for scheduling up to four scheduling units (for example, four TBs or CBGs). The UE 115 may be configured to generate a HARQ codebook 425-*a* to include four bits for each instance of DCI 405, even if an instance of DCI 405 schedules fewer than four scheduling units, where each of the four bits may correspond to an ACK or NACK bit 410, a reporting bit 415, or a padded NACK bit 420.

In an example implementation, when the instance of DCI 405-*d* schedules one scheduling unit, and the UE 115 successfully decodes or otherwise receives the one scheduling unit, the acknowledgment feedback resources allocated for the instance of DCI 405-*d* may include one ACK bit 410-*c* (for example, to indicate that the UE 115 successfully decoded the scheduling unit) and three reporting bits 415-*g*, 415-*h*, and 415-*i*. In another example implementation, when the instance of DCI 405-*e* schedules one scheduling unit, and the UE 115 successfully decodes or otherwise receives the one scheduling unit, the acknowledgment feedback resources allocated for the instance of DCI 405-*e* may include one ACK bit 410-*d* (for example, to indicate that the UE 115 successfully decoded the scheduling unit) and three reporting bits 415-*j*, 415-*k*, and 415-*l*.

In various implementations, any one or more of the reporting bits 415-*g* through 415-*l*, or various combinations thereof, may support indicating one or more of a requested MCS, a requested beam index, an MPE value, or a PH value, among other signaling. In some implementations, the UE 115 may jointly report additional control information using reporting bits 415 that correspond to different instances of DCI 405. In one implementation, additional control information may be communicated via a bit sequence having six bits (for example, a 6-bit Delta-MCS report), where the reporting bits 415-*a* though 415-*c* may correspond to the first three bits of the bit sequence and the reporting bits 415-*d* through 415-*f* may correspond to the last three bits of the bit sequence. Alternatively, the reporting bits 415-*g*, 415-*h*, and 415-*i* may indicate first control information (for example, a requested beam configuration for a subsequent PDSCH transmission) and the reporting bits 415-*j*, 415-*k*, and 415-*l* may indicate second control information (for example, a requested MCS for a subsequent PDSCH transmission) that is different from the first control information.

Figure 5:
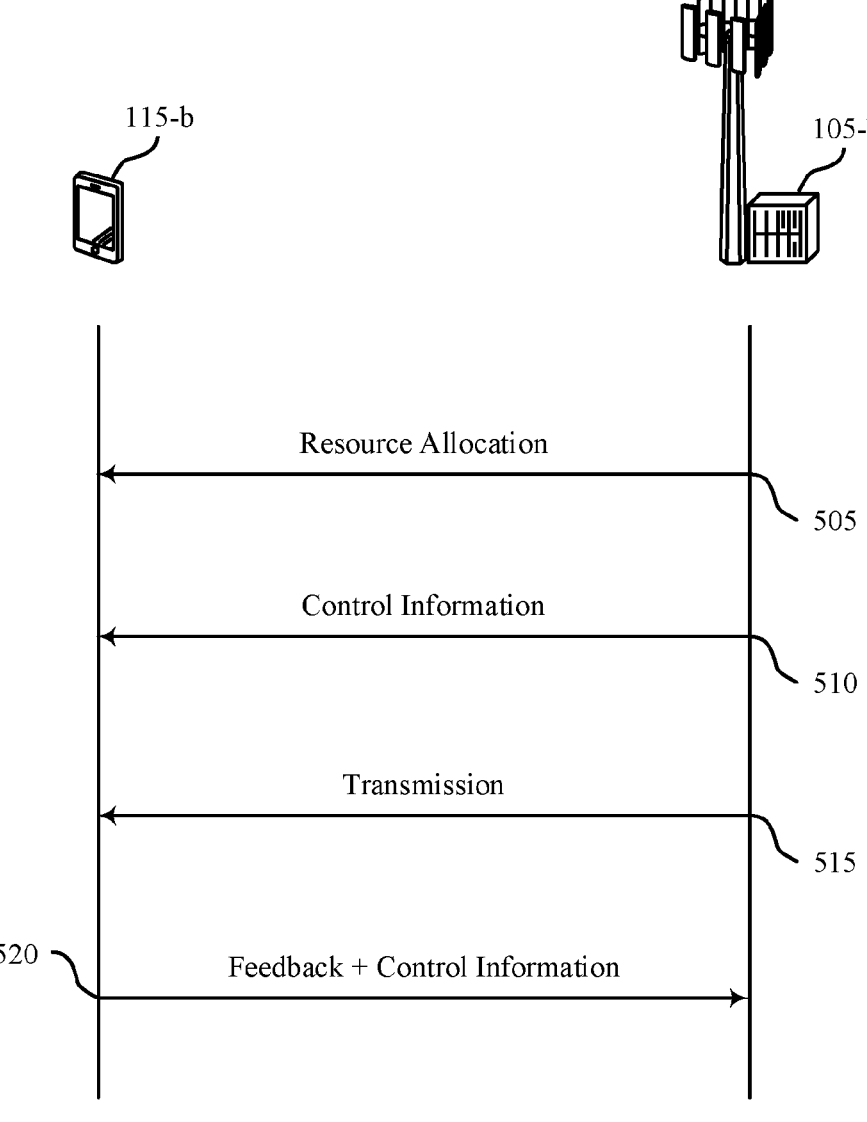
FIG. 5 illustrates an example of a process flow that supports reallocation of padded acknowledgment resources.

FIG. 5 illustrates an example of a process flow 500 that supports reallocation of padded acknowledgment resources. The process flow 500 may implement or be implemented to realize aspects of the wireless communications system 100, the signaling diagram 200, the signaling map 300, the signaling map 400, the signaling map 401, or a combination thereof. For example, the process flow 500 may illustrate communications between a network entity (for example, one or more components of a BS 105-*b*) and a UE 115-*b*, which may be examples of corresponding devices described herein, including with reference to FIGS. 1-4B. In some implementations, the UE 115-*b* may be an example of a sidelink device or a sidelink node (for example, as a relay device performing sidelink communications, as an endpoint device performing sidelink communications). For example, as a relay device, the UE 115-*b* may communicate with a second UE 115 (not shown) over a sidelink connection, and may relay communications between the BS 105-*b* and the second UE 115. Additionally, or alternatively, as an endpoint device, the UE 115-*b* may be configured to communicate with the base station 105-*b* using communications that are relayed via a second UE 115 (not shown).

In the following description of the process flow 500, the operations may be performed in a different order than the order shown, or during overlapping durations. Specific operations also may be left out of the process flow 500, or other operations may be added to the process flow 500. Further, although some operations or signaling may be shown to occur at different times for discussion purposes, these operations may actually occur at the same time.

At 505, the BS 105-*b* may transmit an indication of resources allocated for ACK feedback, which may be received by the UE 115-*b*. In some implementations, the allocated resources may correspond to one or more instances of DCI, or one or more downlink transmissions. A size of the allocated resources (for example, a quantity of HARQ information bits) may be based on a quantity of TBs or CBGs, or other scheduling units, that may be scheduled by each instance of DCI.

At 510, the BS 105-*b* may transmit control information (for example, an instance of DCI, at least a portion of a PDCCH) scheduling a transmission (for example, a downlink transmission), which may be received by the UE 115-*b*. The transmission scheduled by the control information of 510 may include a quantity of TBs, a quantity of CBGs, or both. In various implementations, the UE 115-*b* may or may not be able to successfully decode or otherwise receive the control information of 510.

At 515, the BS 105-*b* may transmit the transmission scheduled by the control information of 510 to the UE 115-*b* (for example, at least a portion of a PDSCH). In some implementations, the transmission of 515 and the control information of 510 may be transmitted concurrently, or otherwise using a same set of resources. For example, the transmission of 515 and the control information of 510 may be portions of a same physical resource block or other set of resources. In various implementations, if the UE 115-*b* successfully decodes a portion of the transmission 515, the UE 115-*b* may generate one or more ACK bits for the successfully decoded portion and, if the UE 115-*b* is unable to successfully decode a portion of the transmission 515, the UE 115-*b* may generate one or more NACK bits for the unsuccessfully decoded portion.

At 520, the UE 115-*b* may transmit acknowledgment feedback to the BS 105-*b* (for example, positive or negative acknowledgment feedback responsive to the control information of 510, or responsive to the transmission of 515, or both) using at least a portion the resources allocated by the resource allocation of 505. In some implementations, the UE 115-*b* also may use at least a portion the allocated resources to transmit additional control information to the BS 105-*b*. The additional control information may indicate one or more of a requested MCS for a subsequent downlink transmission, a requested transmission beam for a subsequent downlink transmission, an MPE value associated with transmitting the ACK feedback, or an uplink PH value relative to a transmission power capability of the UE 115-*b*, among other signaling or combination of signaling. In some implementations, the UE 115-*b* may determine whether to transmit additional control information based on a size of the allocated resources and a size of the acknowledgment feedback. For example, the transmission of additional control information may be associated with a difference between a size of resources allocated for acknowledgment feedback and a size of the acknowledgment feedback. Additionally, or alternatively, the UE 115-*b* may determine whether to transmit additional control information based on whether the UE 115-*b* successfully receives the control information of 510, or the scheduled transmission of 515, or both. In some implementations, the feedback and any additional control information of 520 may be communicated in an instance of UCI.

Figure 6:
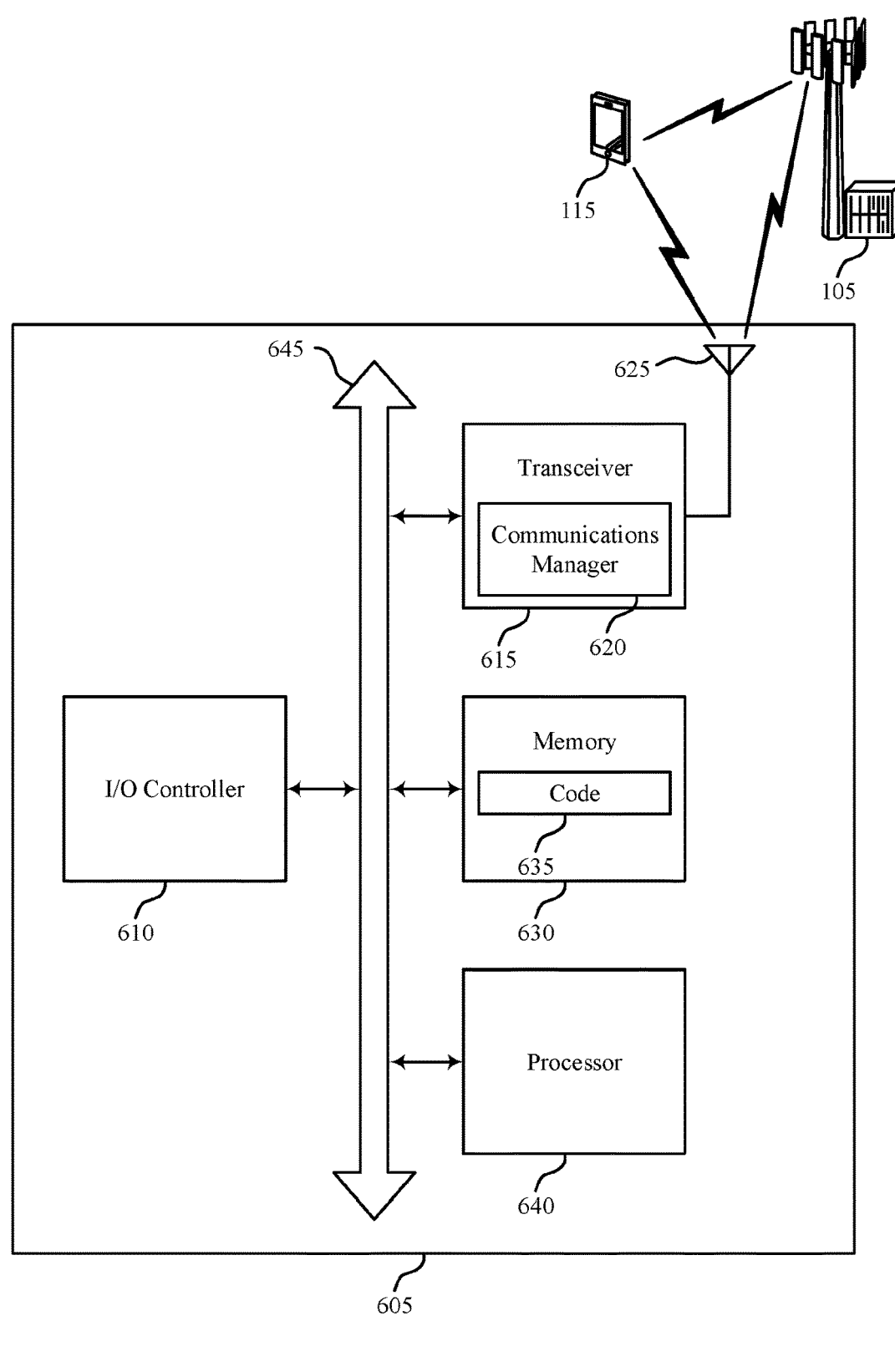
FIG. 6 shows a diagram of an example system including a device that supports reallocation of padded acknowledgment resources.

FIG. 6 shows a diagram of an example system 600 including a device 605 that supports reallocation of padded acknowledgment resources. The device 605 may communicate wirelessly with one or more BSs 105, UEs 115, or any combination thereof. The device 605 may include components for bi-directional voice and data communications including components for transmitting and receiving communications, such as a communications manager 620, an input/output (I/O) controller 610, a transceiver 615, an antenna 625, a memory 630, code 635, and a processor 640. These components may be in electronic communication or otherwise coupled (for example, operatively, communicatively, functionally, electronically, electrically) via one or more buses (for example, a bus 645).

The I/O controller 610 may manage input and output signals for the device 605. The I/O controller 610 also may manage peripherals not integrated into the device 605. In some implementations, the I/O controller 610 may represent a physical connection or port to an external peripheral. In some implementations, the I/O controller 610 may utilize an operating system such as iOS®, ANDROID®, MS-DOS®, MS-WINDOWS®, OS/2®, UNIX®, LINUX®, or another known operating system. Additionally, or alternatively, the I/O controller 610 may represent or interact with a modem, a keyboard, a mouse, a touchscreen, or a similar device. In some implementations, the I/O controller 610 may be implemented as part of a processor or processing system, such as the processor 640. In some implementations, a user may interact with the device 605 via the I/O controller 610 or via hardware components controlled by the I/O controller 610.

In some implementations, the device 605 may include a single antenna 625. However, in some other implementations, the device 605 may have more than one antenna 625, which may be capable of concurrently transmitting or receiving multiple wireless transmissions. The transceiver 615 may communicate bi-directionally, via the one or more antennas 625, wired, or wireless links as described herein. For example, the transceiver 615 may represent a wireless transceiver and may communicate bi-directionally with another wireless transceiver. The transceiver 615 also may include a modem to modulate the packets, to provide the modulated packets to one or more antennas 625 for transmission, and to demodulate packets received from the one or more antennas 625. In some implementations, the transceiver 615 may include one or more interfaces, such as one or more interfaces coupled with the one or more antennas 625 that are configured to support various receiving or obtaining operations, or one or more interfaces coupled with the one or more antennas 625 that are configured to support various transmitting or outputting operations, or a combination thereof. In some implementations, the transceiver 615 may include or be configured for coupling with one or more processors or memory components that are operable to perform or support operations based on received or obtained information or signals, or to generate information or other signals for transmission or other outputting, or any combination thereof. In some implementations, the transceiver 615, or the transceiver 615 and the one or more antennas 625, or the transceiver 615 and the one or more antennas 625 and one or more processors or memory components (for example, the processor 640, or the memory 630, or both), may be included in a chip or chip assembly that is installed in the device 605.

The memory 630 may include random access memory (RAM) and read-only memory (ROM). The memory 630 may store computer-readable, computer-executable code 635 including instructions that, when executed by the processor 640, cause the device 605 to perform various functions described herein. The code 635 may be stored in a non-transitory computer-readable medium such as system memory or another type of memory. In some implementations, the code 635 may not be directly executable by the processor 640 but may cause a computer (for example, when compiled and executed) to perform functions described herein. In some implementations, the memory 630 may contain, among other things, a basic I/O system (BIOS) which may control basic hardware or software operation such as the interaction with peripheral components or devices.

The processor 640 may be any one or more suitable processors capable of executing scripts or instructions of one or more software programs stored in the device 605 (such as within the memory 630). In some implementations, the processor 640 may be a component of a processing system. A processing system may generally refer to a system or series of machines or components that receives inputs and processes the inputs to produce a set of outputs (which may be passed to other systems or components of, for example, the device 605). For example, a processing system of the device 605 may refer to a system including the various other components or subcomponents of the device 605, such as the processor 640, or the transceiver 615, or the communications manager 620, or other components or combinations of components of the device 605.

The processing system of the device 605 may interface with other components of the device 605, and may process information received from other components (such as inputs or signals) or output information to other components. For example, a chip or modem of the device 605 may include a processing system, a first interface to output information, and a second interface to obtain information. In some implementations, the first interface may refer to an interface between the processing system of the chip or modem and a transmitter, such that the device 605 may transmit information output from the chip or modem. In some implementations, the second interface may refer to an interface between the processing system of the chip or modem and a receiver, such that the device 605 may obtain information or signal inputs, and the information may be passed to the processing system. A person having ordinary skill in the art will readily recognize that the first interface also may obtain information or signal inputs, and the second interface also may output information or signal outputs.

The communications manager 620 may support wireless communication at a UE. For example, the communications manager 620 may be configured as or otherwise support a means for receiving or otherwise obtaining an indication of resources allocated for acknowledgment feedback. The communications manager 620 may be configured as or otherwise support a means for receiving or otherwise obtaining, from a network entity, control information scheduling a transmission to the device 605. The communications manager 620 may be configured as or otherwise support a means for transmitting or otherwise outputting, to the network entity using the resources allocated for acknowledgment feedback, the acknowledgment feedback and additional control information associated with a difference between a size of resources allocated for acknowledgment feedback and a size of the acknowledgment feedback.

In some implementations, the control information schedules transmission of a set of multiple TBs, and the communications manager 620 may be configured as or otherwise support a means for generating the additional control information according to a difference between a size of the resources allocated for acknowledgment feedback for a first TB of the plurality and a size of the acknowledgment feedback for the first TB, and a difference between a size of the resources allocated for acknowledgment feedback for a second TB of the plurality and a size of the acknowledgment feedback for the second TB.

In some implementations, to support transmitting or otherwise outputting the acknowledgment feedback and the additional control information, the communications manager 620 may be configured as or otherwise support a means for transmitting or otherwise outputting, using the resources allocated for acknowledgment feedback for the first TB, the acknowledgment feedback for the first TB and a first portion of a bit sequence of the additional control information. In some implementations, to support transmitting or otherwise outputting the acknowledgment feedback and the additional control information, the communications manager 620 may be configured as or otherwise support a means for transmitting or otherwise outputting, using the resources allocated for acknowledgment feedback for the second TB, the acknowledgment feedback for the second TB and a second portion of the bit sequence of the additional control information.

In some implementations, receiving or otherwise obtaining the control information may include successfully decoding a first instance of DCI scheduling transmission of a first TB and unsuccessfully decoding a second instance of DCI scheduling transmission of a second TB. In some implementations, transmitting or otherwise outputting the acknowledgment feedback and the additional control information may include transmitting or otherwise outputting the acknowledgment feedback for the first TB and the additional control information using the resources allocated for acknowledgment feedback for the first TB, and transmitting or otherwise outputting the acknowledgment feedback for the second TB without additional control information using the resources allocated for acknowledgment feedback for the second TB.

In some implementations, the communications manager 620 may be configured as or otherwise support a means for generating the additional control information to include at least one of an indication to request an MCS for subsequent downlink transmission, an indication to request a transmission beam for subsequent downlink transmission, an indication of an MPE associated with an uplink transmission, or an indication of an uplink PH relative to a transmission power capability of the device 605.

In some implementations, the communications manager 620 may be configured as or otherwise support a means for receiving or otherwise obtaining, from the network entity, an indication of information to be included in the additional control information. In some implementations, the communications manager 620 may be configured as or otherwise support a means for generating the additional control information based on receiving or otherwise obtaining the indication of the information.

In some implementations, the resources allocated for acknowledgment feedback are associated with a first quantity of TBs, and the communications manager 620 may be configured as or otherwise support a means for generating the additional control information based on the control information scheduling transmission of a second quantity of TBs that is less than the first quantity of TBs.

In some implementations, the resources allocated for acknowledgment feedback are associated with a quantity of CBGs per TB, and the communications manager 620 may be configured as or otherwise support a means for generating the additional control information based on the control information scheduling transmission of a TB having a quantity of CBGs that is smaller than the quantity of CBGs per TB.

In some implementations, the communications manager 620 may be configured to perform various operations (for example, receiving, monitoring, transmitting) using or otherwise in cooperation with the transceiver 615, the one or more antennas 625, or any combination thereof. Although the communications manager 620 is illustrated as a separate component, in some implementations, one or more functions described with reference to the communications manager 620 may be supported by or performed by the processor 640, the memory 630, the code 635, or any combination thereof. For example, the code 635 may include instructions executable by the processor 640 to cause the device 605 to perform various aspects of reallocation of padded acknowledgment resources as described herein, or the processor 640 and the memory 630 may be otherwise configured to perform or support such operations.

Figure 7:
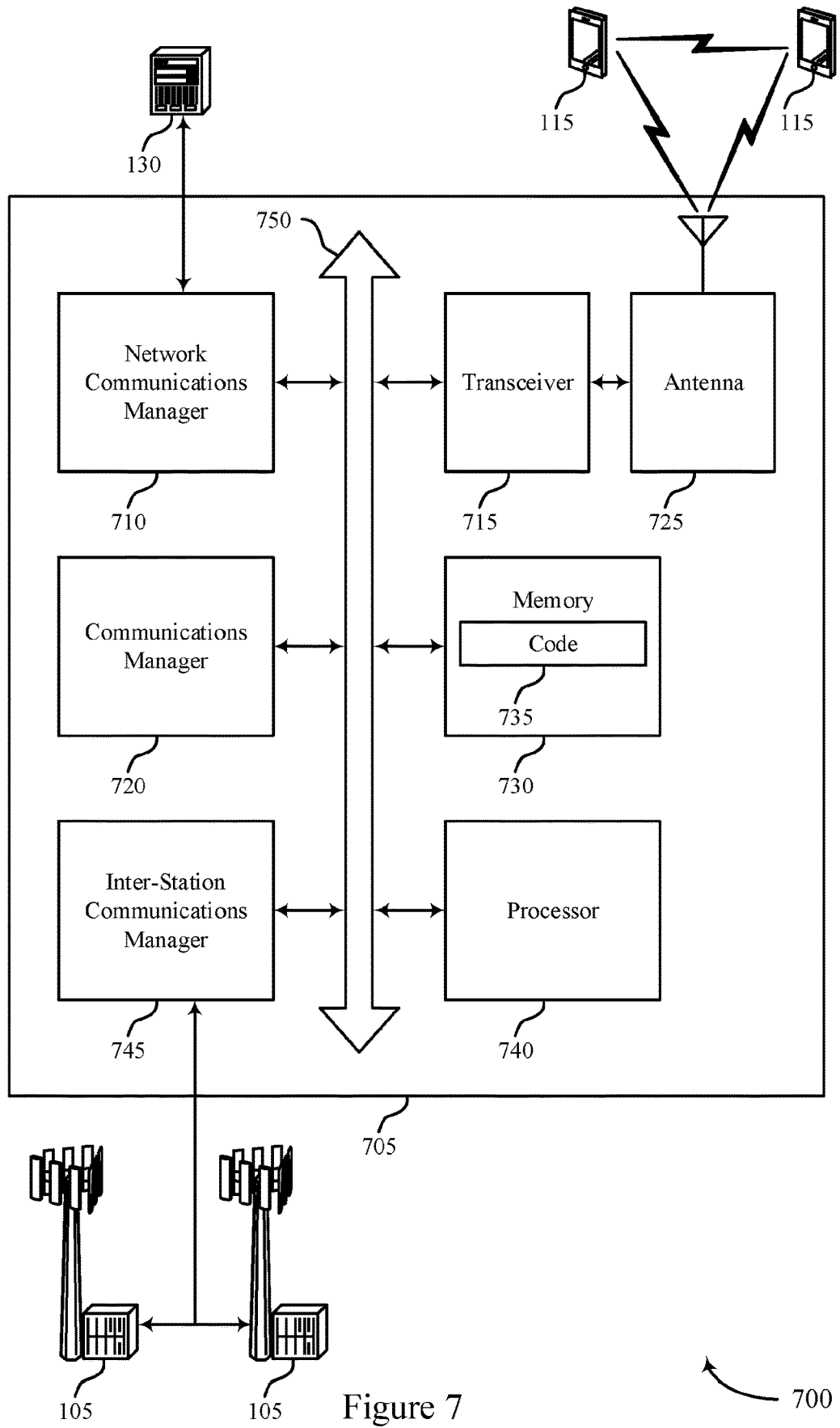
FIG. 7 shows a diagram of an example system including a device that supports reallocation of padded acknowledgment resources.

FIG. 7 shows a diagram of an example system 700 including a device 705 that supports reallocation of padded acknowledgment resources. The device 705 may include components for bi-directional voice and data communications including components for transmitting and receiving communications, such as a communications manager 720, a network communications manager 710, a transceiver 715, an antenna 725, a memory 730, code 735, a processor 740, and an inter-station communications manager 745. These components may be in electronic communication or otherwise coupled (for example, operatively, communicatively, functionally, electronically, electrically) via one or more buses (for example, a bus 750).

The network communications manager 710 may manage communications with a core network 130 (for example, via one or more wired backhaul links). For example, the network communications manager 710 may manage the transfer of data communications for client devices, such as one or more UEs 115.

In some implementations, the device 705 may include a single antenna 725. However, in some other cases the device 705 may have more than one antenna 725, which may be capable of concurrently transmitting or receiving multiple wireless transmissions. The transceiver 715 may communicate bi-directionally, via the one or more antennas 725, wired, or wireless links as described herein. For example, the transceiver 715 may represent a wireless transceiver and may communicate bi-directionally with another wireless transceiver. The transceiver 715 also may include a modem to modulate the packets, to provide the modulated packets to one or more antennas 725 for transmission, and to demodulate packets received from the one or more antennas 725.

The memory 730 may include RAM and ROM. The memory 730 may store computer-readable, computer-executable code 735 including instructions that, when executed by the processor 740, cause the device 705 to perform various functions described herein. The code 735 may be stored in a non-transitory computer-readable medium such as system memory or another type of memory. In some implementations, the code 735 may not be directly executable by the processor 740 but may cause a computer (for example, when compiled and executed) to perform functions described herein. In some implementations, the memory 730 may contain, among other things, a BIOS which may control basic hardware or software operation such as the interaction with peripheral components or devices.

The processor 740 may include an intelligent hardware device (for example, a general-purpose processor, a DSP, a CPU, a microcontroller, an ASIC, an FPGA, a programmable logic device, a discrete gate or transistor logic component, a discrete hardware component, or any combination thereof). In some implementations, the processor 740 may be configured to operate a memory array using a memory controller. In some other cases, a memory controller may be integrated into the processor 740. The processor 740 may be configured to execute computer-readable instructions stored in a memory (for example, the memory 730) to cause the device 705 to perform various functions (for example, functions or tasks supporting reallocation of padded acknowledgment resources). For example, the device 705 or a component of the device 705 may include a processor 740 and memory 730 coupled to the processor 740, the processor 740 and memory 730 configured to perform various functions described herein.

The inter-station communications manager 745 may manage communications with other BSs 105, and may include a controller or scheduler for controlling communications with UEs 115 in cooperation with other BSs 105. For example, the inter-station communications manager 745 may coordinate scheduling for transmissions to UEs 115 for various interference mitigation techniques such as beamforming or joint transmission. In some implementations, the inter-station communications manager 745 may provide an X2 interface within an LTE/LTE-A wireless communications network technology to provide communication between BSs 105.

The communications manager 720 may support wireless communication at a network entity. For example, the communications manager 720 may be configured as or otherwise support a means for transmitting or otherwise outputting an indication of resources allocated for acknowledgment feedback. The communications manager 720 may be configured as or otherwise support a means for transmitting or otherwise outputting control information scheduling a transmission to a UE. The communications manager 720 may be configured as or otherwise support a means for receiving or otherwise obtaining, using the resources allocated for acknowledgment feedback, the acknowledgment feedback and additional control information associated with a difference between a size of the resources allocated for acknowledgment feedback and a size of the acknowledgment feedback.

In some implementations, the control information may schedule transmission of a set of multiple TBs, and receiving or otherwise obtaining the additional control information may be associated with a difference between a size of the resources allocated for acknowledgment feedback for a first TB of the plurality and a size of the acknowledgment feedback for the first TB, and a difference between a size of the resources allocated for acknowledgment feedback for a second TB of the plurality and a size of the acknowledgment feedback for the second TB.

In some implementations, to support receiving or otherwise obtaining the acknowledgment feedback and the additional control information, the communications manager 720 may be configured as or otherwise support a means for receiving or otherwise obtaining, using the resources allocated for acknowledgment feedback for the first TB, the acknowledgment feedback for the first TB and a first portion of a bit sequence of the additional control information, and receiving or otherwise obtaining, using the resources allocated for acknowledgment feedback for the second TB, the acknowledgment feedback for the second TB and a second portion of the bit sequence of the additional control information.

In some implementations, to support receiving or otherwise obtaining the acknowledgment feedback and the additional control information, the communications manager 720 may be configured as or otherwise support a means for receiving or otherwise obtaining the acknowledgment feedback for the first TB and the additional control information using the resources allocated for acknowledgment feedback for the first TB, and receiving or otherwise obtaining the acknowledgment feedback for the second TB without additional control information using the resources allocated for acknowledgment feedback for the second TB. In some implementations, the communications manager 720 may be configured as or otherwise support a means for determining, based on the resources allocated for acknowledgment feedback for the second TB not including additional control information, that an instance of DCI scheduling the transmission of the second TB was unsuccessfully decoded.

In some implementations, to support receiving or otherwise obtaining the additional control information, the communications manager 720 may be configured as or otherwise support a means for receiving or otherwise obtaining at least one of an indication requesting an MCS for subsequent downlink transmission, an indication requesting a transmission beam for subsequent downlink transmission, an indication of an MPE associated with an uplink transmission, or an indication of an uplink PH relative to a transmission power capability of the UE.

In some implementations, the communications manager 720 may be configured as or otherwise support a means for transmitting or otherwise outputting an indication of information to be included in the additional control information, and the additional control information may include information selected based on the indication of the information.

In some implementations, the resources allocated for acknowledgment feedback may be associated with a first quantity of TBs, and receiving or otherwise obtaining the additional control information may be based on the control information scheduling transmission of a second quantity of TBs that is less than the first quantity of TBs.

In some implementations, the resources allocated for acknowledgment feedback may be associated with a quantity of CBGs per TB, and receiving or otherwise obtaining the additional control information may be based on the control information scheduling transmission of a TB having a quantity of CBGs that is smaller than the quantity of CBGs per TB.

In some implementations, the communications manager 720 may be configured to perform various operations (for example, receiving, monitoring, transmitting) using or otherwise in cooperation with the transceiver 715, the one or more antennas 725, or any combination thereof. Although the communications manager 720 is illustrated as a separate component, in some implementations, one or more functions described with reference to the communications manager 720 may be supported by or performed by the processor 740, the memory 730, the code 735, or any combination thereof. For example, the code 735 may include instructions executable by the processor 740 to cause the device 705 to perform various aspects of reallocation of padded acknowledgment resources as described herein, or the processor 740 and the memory 730 may be otherwise configured to perform or support such operations.

FIG. 8 shows a flowchart illustrating an example method 800 that supports reallocation of padded acknowledgment resources. The operations of the method 800 may be implemented by a UE or its components as described herein. For example, the operations of the method 800 may be performed by a UE 115 as described with reference to FIGS. 1 through 6. In some implementations, a UE may execute a set of instructions to control the functional elements of the UE to perform the described functions. Additionally, or alternatively, the UE may perform aspects of the described functions using special-purpose hardware.

At 805, the method may include receiving an indication of resources allocated for acknowledgment feedback. In some implementations, the operations of 805 may be performed by a communications manager 620 as described with reference to FIG. 6.

At 810, the method may include receiving, from a network entity, control information scheduling a transmission to the UE. In some implementations, the operations of 810 may be performed by a communications manager 620 as described with reference to FIG. 6.

At 815, the method may include transmitting, to the network entity using the resources allocated for acknowledgment feedback, the acknowledgment feedback and additional control information associated with a difference between a size of resources allocated for acknowledgment feedback and a size of the acknowledgment feedback. In some implementations, the operations of 815 may be performed by a communications manager 620 as described with reference to FIG. 6.

Figure 9:
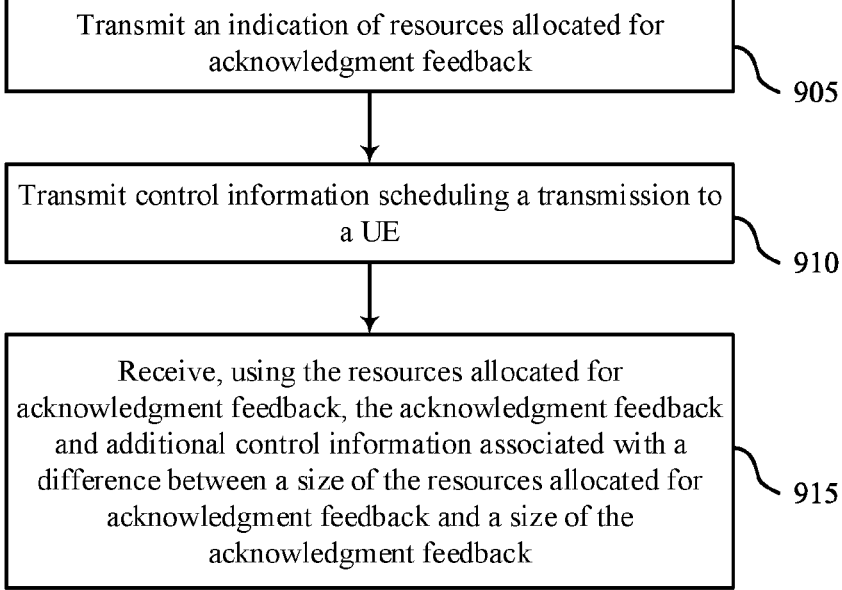

FIG. 9 shows a flowchart illustrating an example method 900 that supports reallocation of padded acknowledgment resources. The operations of the method 900 may be implemented by a network entity or its components as described herein. For example, the operations of the method 900 may be performed by a network entity as described with reference to FIGS. 1 through 5 and 7. In some implementations, a network entity may execute a set of instructions to control the functional elements of the network entity to perform the described functions. Additionally, or alternatively, the network entity may perform aspects of the described functions using special-purpose hardware.

At 905, the method may include transmitting an indication of resources allocated for acknowledgment feedback. In some implementations, the operations of 905 may be performed by a communications manager 720 as described with reference to FIG. 7.

At 910, the method may include transmitting control information scheduling a transmission to a UE. In some implementations, the operations of 910 may be performed by a communications manager 720 as described with reference to FIG. 7.

At 915, the method may include receiving, using the resources allocated for acknowledgment feedback, the acknowledgment feedback and additional control information associated with a difference between a size of the resources allocated for acknowledgment feedback and a size of the acknowledgment feedback. In some implementations, the operations of 915 may be performed by a communications manager 720 as described with reference to FIG. 7.

The following provides an overview of some aspects of the present disclosure:

Aspect 1: A method for wireless communication at a UE, including: receiving or otherwise obtaining an indication of resources allocated for acknowledgment feedback; receiving or otherwise obtaining, from a network entity, control information scheduling a transmission to the UE; and transmitting or otherwise outputting, to the network entity using the resources allocated for acknowledgment feedback, the acknowledgment feedback and additional control information associated with a difference between a size of resources allocated for acknowledgment feedback and a size of the acknowledgment feedback.

Aspect 2: The method of aspect 1, where the control information schedules transmission of multiple TBs, the method further including: generating the additional control information according to a difference between a size of the resources allocated for acknowledgment feedback for a first TB of the multiple TBs and a size of the acknowledgment feedback for the first TB, and a difference between a size of the resources allocated for acknowledgment feedback for a second TB of the multiple TBs and a size of the acknowledgment feedback for the second TB.

Aspect 3: The method of aspect 2, where transmitting or otherwise outputting the acknowledgment feedback and the additional control information includes: transmitting or otherwise outputting, using the resources allocated for acknowledgment feedback for the first TB, the acknowledgment feedback for the first TB and a first portion of a bit sequence of the additional control information; and transmitting or otherwise outputting, using the resources allocated for acknowledgment feedback for the second TB, the acknowledgment feedback for the second TB and a second portion of the bit sequence of the additional control information.

Aspect 4: The method of any of aspects 1 through 3, where receiving or otherwise obtaining the control information includes: successfully decoding a first instance of DCI scheduling transmission of a first TB; and unsuccessfully decoding a second instance of DCI scheduling transmission of a second TB; and where transmitting or otherwise outputting the acknowledgment feedback and the additional control information includes: transmitting or otherwise outputting the acknowledgment feedback for the first TB and the additional control information using the resources allocated for acknowledgment feedback for the first TB; and transmitting or otherwise outputting the acknowledgment feedback for the second TB without additional control information using the resources allocated for acknowledgment feedback for the second TB.

Aspect 5: The method of any of aspects 1 through 4, further including: generating the additional control information to include at least one of an indication to request an MCS for subsequent downlink transmission, an indication to request a transmission beam for subsequent downlink transmission, an indication of an MPE associated with an uplink transmission, or an indication of an uplink PH relative to a transmission power capability of the UE.

Aspect 6: The method of any of aspects 1 through 5, further including: receiving or otherwise obtaining, from the network entity, an indication of information to be included in the additional control information; and generating the additional control information based on receiving the indication.

Aspect 7: The method of any of aspects 1 through 6, where the resources allocated for acknowledgment feedback are associated with a first quantity of TBs, the method further including: generating the additional control information based on the control information scheduling transmission of a second quantity of TBs that is less than the first quantity of TBs.

Aspect 8: The method of any of aspects 1 through 7, where the resources allocated for acknowledgment feedback are associated with a quantity of CBGs per TB, the method further including: generating the additional control information based on the control information scheduling transmission of a TB having a quantity of CBGs that is smaller than the quantity of CBGs per TB.

Aspect 9: A method for wireless communication at a network entity, including: transmitting or otherwise outputting an indication of resources allocated for acknowledgment feedback; transmitting or otherwise outputting control information scheduling a transmission to a UE; and receiving or otherwise obtaining, using the resources allocated for acknowledgment feedback, the acknowledgment feedback and additional control information associated with a difference between a size of the resources allocated for acknowledgment feedback and a size of the acknowledgment feedback.

Aspect 10: The method of aspect 9, where the control information schedules transmission of multiple TBs, and receiving or otherwise obtaining the additional control information is associated with a difference between a size of the resources allocated for acknowledgment feedback for a first TB of the multiple TBs and a size of the acknowledgment feedback for the first TB, and a difference between a size of the resources allocated for acknowledgment feedback for a second TB of the multiple TBs and a size of the acknowledgment feedback for the second TB.

Aspect 11: The method of aspect 10, where receiving or otherwise obtaining the acknowledgment feedback and the additional control information includes: receiving or otherwise obtaining, using the resources allocated for acknowledgment feedback for the first TB, the acknowledgment feedback for the first TB and a first portion of a bit sequence of the additional control information; and receiving or otherwise obtaining, using the resources allocated for acknowledgment feedback for the second TB, the acknowledgment feedback for the second TB and a second portion of the bit sequence of the additional control information.

Aspect 12: The method of aspect 10, where receiving or otherwise obtaining the acknowledgment feedback and the additional control information includes: receiving or otherwise obtaining the acknowledgment feedback for the first TB and the additional control information using the resources allocated for acknowledgment feedback for the first TB; and receiving or otherwise obtaining the acknowledgment feedback for the second TB without additional control information using the resources allocated for acknowledgment feedback for the second TB.

Aspect 13: The method of aspect 12, further including: determining, based on the resources allocated for acknowledgment feedback for the second TB not including additional control information, that an instance of DCI scheduling the transmission of the second TB was unsuccessfully decoded.

Aspect 14: The method of any of aspects 9 through 13, where receiving or otherwise obtaining the additional control information includes: receiving or otherwise obtaining at least one of an indication requesting an MCS for subsequent downlink transmission, an indication requesting a transmission beam for subsequent downlink transmission, an indication of an MPE associated with an uplink transmission, or an indication of an uplink PH relative to a transmission power capability of the UE.

Aspect 15: The method of any of aspects 9 through 14, further including: transmitting or otherwise outputting an indication of information to be included in the additional control information, where the additional control information includes information selected based on the indication.

Aspect 16: The method of any of aspects 9 through 15, where the resources allocated for acknowledgment feedback are associated with a first quantity of TBs, and receiving the additional control information is based on the control information scheduling transmission of a second quantity of TBs that is less than the first quantity of TBs.

Aspect 17: The method of any of aspects 9 through 16, where the resources allocated for acknowledgment feedback are associated with a quantity of CBGs per TB, and where receiving the additional control information is based on the control information scheduling transmission of a TB having a quantity of CBGs that is smaller than the quantity of CBGs per TB.

Aspect 18: An apparatus for wireless communication at a UE including a processor; memory coupled with the processor; and instructions stored in the memory and executable by the processor to cause the apparatus to perform a method of any of aspects 1 through 8.

Aspect 19: An apparatus for wireless communication at a UE including a processor and at least interface for performing a method of any of aspects 1 through 8.

Aspect 19: An apparatus for wireless communication at a UE including at least one means for performing a method of any of aspects 1 through 8.

Aspect 20: A non-transitory computer-readable medium storing code for wireless communication at a UE, the code including instructions executable by a processor to perform a method of any of aspects 1 through 8.

Aspect 21: An apparatus for wireless communication at a network entity including a processor; memory coupled with the processor; and instructions stored in the memory and executable by the processor to cause the apparatus to perform a method of any of aspects 9 through 17.

Aspect 22: An apparatus for wireless communication at a network entity including a processor and at least one interface for performing a method of any of aspects 9 through 17.

Aspect 22: An apparatus for wireless communication at a network entity, including at least one means for performing a method of any of aspects 9 through 17.

Aspect 23: A non-transitory computer-readable medium storing code for wireless communication at a network entity, the code including instructions executable by a processor to perform a method of any of aspects 9 through 17.

As used herein, the term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, or any processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also can be implemented as one or more computer programs, such as one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of any device as implemented.

Certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described above as acting in some combinations and even initially claimed as such, one or more features from a claimed combination can be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted can be incorporated in the example processes that are schematically illustrated. For example, one or more additional operations can be performed before, after, simultaneously, or between any of the illustrated operations. In some circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, other implementations are within the scope of the following claims. In some implementations, the actions recited in the claims can be performed in a different order and still achieve desirable results.

What is claimed is:

1. A user equipment (UE), comprising:
a processing system that includes one or more processors and one or more memories coupled with the one or more processors, the processing system configured to cause the UE to:
receive an indication of resources allocated for acknowledgment feedback;
receive, from a network entity, control information scheduling a transmission to the UE, the control information comprising:
a first instance of downlink control information (DCI) scheduling transmission of a first transport block (TB); and
a second instance of DCI scheduling transmission of a second TB;
transmit, to the network entity using the resources allocated for acknowledgment feedback for the first TB and in accordance with successfully decoding the first instance of DCI, the acknowledgment feedback for the first TB and additional control information associated with a difference between a size of resources allocated for acknowledgment feedback and a size of the acknowledgment feedback; and
transmit, to the network entity using the resources allocated for acknowledgment feedback for the second TB and in accordance with unsuccessfully decoding the second instance of DCI, the acknowledgment feedback for the second TB without additional control information.

2. The UE of claim 1, wherein the processing system is further configured to cause the UE to:
generate the additional control information, based at least in part on the control information scheduling transmission of a plurality of transport blocks (TBs), according to a difference between a size of the resources allocated for acknowledgment feedback for a third TB of the plurality of TBs and a size of the acknowledgment feedback for the third TB, and a difference between a size of the resources allocated for acknowledgment feedback for a fourth TB of the plurality of TBs and a size of the acknowledgment feedback for the fourth TB.

3. The UE of claim 2, wherein, to transmit the acknowledgment feedback and the additional control information, the processing system is further configured to cause the UE to:

transmit, using the resources allocated for acknowledgment feedback for the third TB, the acknowledgment feedback for the third TB and a first portion of a bit sequence of the additional control information; and
transmit, using the resources allocated for acknowledgment feedback for the fourth TB, the acknowledgment feedback for the fourth TB and a second portion of the bit sequence of the additional control information.

4. The UE of claim 1, wherein the processing system is further configured to cause the UE to:
generate the additional control information to include at least one of an indication to request a modulation and coding scheme (MCS) for a subsequent downlink transmission, an indication to request a transmission beam for a subsequent downlink transmission, an indication of a maximum permissible exposure (MPE) associated with an uplink transmission, or an indication of an uplink power headroom (PH) relative to a transmission power capability of the UE.

5. The UE of claim 1, wherein the processing system is further configured to cause the UE to:
receive, from the network entity, an indication of information to be included in the additional control information; and
generate the additional control information based at least in part on obtaining the indication of information.

6. The UE of claim 1, wherein the resources allocated for acknowledgment feedback are associated with a first quantity of transport blocks (TBs), and the processing system is further configured to cause the UE to:
generate the additional control information based at least in part on the control information scheduling transmission of a second quantity of TBs that is less than the first quantity of TBs.

7. The UE of claim 1, wherein the resources allocated for acknowledgment feedback are associated with a quantity of code block groups (CBGs) per transport block (TB), and the processing system is further configured to cause the UE to:
generate the additional control information based at least in part on the control information scheduling transmission of a TB having a quantity of CBGs that is smaller than the quantity of CBGs per TB.

8. A network entity, comprising:
a processing system that includes one or more processors and one or more memories coupled with the one or more processors, the processing system configured to cause the network entity to:
transmit an indication of resources allocated for acknowledgment feedback;
transmit control information scheduling a transmission to a user equipment (UE), the control information comprising:
a first instance of downlink control information (DCI) scheduling transmission of a first transport block (TB); and
a second instance of DCI scheduling transmission of a second TB;
receive, using the resources allocated for acknowledgment feedback for the first TB, the acknowledgment feedback for the first TB and additional control information associated with a difference between a size of the resources allocated for acknowledgment feedback and a size of the acknowledgment feedback; and
receive, using the resources allocated for acknowledgment feedback for the second TB, the acknowledgment feedback for the second TB without additional control information, wherein the resources allocated for acknowledgment feedback for the second TB not including additional control information is associated with the second instance of DCI being unsuccessfully decoded.

9. The network entity of claim 8, wherein the control information schedules transmission of a plurality of transport blocks (TBs) and wherein receiving the additional control information is associated with a difference between a size of the resources allocated for acknowledgment feedback for a third TB of the plurality and a size of the acknowledgment feedback for the third TB, and a difference between a size of the resources allocated for acknowledgment feedback for a fourth TB of the plurality and a size of the acknowledgment feedback for the fourth TB.

10. The network entity of claim 9, wherein, to receive the acknowledgment feedback and the additional control information, the processing system is further configured to cause the network entity to:

receive, using the resources allocated for acknowledgment feedback for the third TB, the acknowledgment feedback for the third TB and a first portion of a bit sequence of the additional control information; and receive, using the resources allocated for acknowledgment feedback for the fourth TB, the acknowledgment feedback for the fourth TB and a second portion of the bit sequence of the additional control information.

11. The network entity of claim 8, wherein, to receive the acknowledgment feedback and the additional control information, the processing system is further configured to cause the network entity to:

receive at least one of an indication requesting a modulation and coding scheme (MCS) for subsequent downlink transmission, an indication requesting a transmission beam for subsequent downlink transmission, an indication of a maximum permissible exposure (MPE) associated with an uplink transmission, or an indication of an uplink power headroom (PH) relative to a transmission power capability of the UE.

12. The network entity of claim 8, wherein the processing system is further configured to cause the network entity to:

transmit an indication of information to be included in the additional control information, wherein the additional control information includes information selected based at least in part on the indication of the information.

13. The network entity of claim 8, wherein the resources allocated for acknowledgment feedback are associated with a first quantity of transport blocks (TBs), and wherein the processing system is further configured to cause the network entity to:

receive the additional control information based at least in part on the control information scheduling transmission of a second quantity of TBs that is less than the first quantity of TBs.

14. The network entity of claim 8, wherein the resources allocated for acknowledgment feedback are associated with a quantity of code block groups (CBGs) per transport block (TB), and wherein the processing system is further configured to cause the network entity to:

receive the additional control information based at least in part on the control information scheduling transmission of a TB having a quantity of CBGs that is smaller than the quantity of CBGs per TB.

15. A method for wireless communication at a user equipment (UE), comprising:

receiving an indication of resources allocated for acknowledgment feedback;

receiving, from a network entity, control information scheduling a transmission to the UE, the control information comprising:

a first instance of downlink control information (DCI) scheduling transmission of a first transport block (TB); and a second instance of DCI scheduling transmission of a second TB;

transmitting, to the network entity using the resources allocated for acknowledgment feedback for the first TB and in accordance with successfully decoding the first instance of DCI, the acknowledgment feedback for the first TB and additional control information associated with a difference between a size of the resources allocated for acknowledgment feedback and a size of the acknowledgment feedback; and transmitting, to the network entity using the resources allocated for acknowledgment feedback for the second TB and in accordance with unsuccessfully decoding the second instance of DCI, the acknowledgment feedback for the second TB without additional control information.

16. The method of claim 15, wherein the control information schedules transmission of a plurality of transport blocks (TBs), the method further comprising:

generating the additional control information according to a difference between a size of the resources allocated for acknowledgment feedback for a third TB of the plurality of TBs and a size of the acknowledgment feedback for the third TB, and a difference between a size of the resources allocated for acknowledgment feedback for a fourth TB of the plurality of TBs and a size of the acknowledgment feedback for the fourth TB.

17. The method of claim 16, wherein transmitting the acknowledgment feedback and the additional control information comprises:

transmitting, using the resources allocated for acknowledgment feedback for the third TB, the acknowledgment feedback for the third TB and a first portion of a bit sequence of the additional control information; and transmitting, using the resources allocated for acknowledgment feedback for the fourth TB, the acknowledgment feedback for the fourth TB and a second portion of the bit sequence of the additional control information.

18. The method of claim 15, further comprising:

generating the additional control information to include at least one of an indication to request a modulation and coding scheme (MCS) for subsequent downlink transmission, an indication to request a transmission beam for subsequent downlink transmission, an indication of a maximum permissible exposure (MPE) associated with an uplink transmission, or an indication of an uplink power headroom (PH) relative to a transmission power capability of the UE.

19. The method of claim 15, further comprising:

receiving, from the network entity, an indication of information to be included in the additional control information; and generating the additional control information based at least in part on receiving the indication of information.

20. The method of claim 15, wherein the resources allocated for acknowledgment feedback are associated with a first quantity of transport blocks (TBs), the method further comprising:

generating the additional control information based at least in part on the control information scheduling transmission of a second quantity of TBs that is less than the first quantity of TBs.

21. The method of claim 15, wherein the resources allocated for acknowledgment feedback are associated with a quantity of code block groups (CBGs) per transport block (TB), the method further comprising:

generating the additional control information based at least in part on the control information scheduling transmission of a TB having a quantity of CBGs that is smaller than the quantity of CBGs per TB.

22. A method for wireless communication at a network entity, comprising:

transmitting an indication of resources allocated for acknowledgment feedback;

transmitting control information scheduling a transmission to a user equipment (UE), the control information comprising:

a first instance of downlink control information (DCI) scheduling transmission of a first transport block (TB); and a second instance of DCI scheduling transmission of a second TB;

receiving, using the resources allocated for acknowledgment feedback for the first TB, the acknowledgment feedback for the first TB and additional control information associated with a difference between a size of the resources allocated for acknowledgment feedback and a size of the acknowledgment feedback; and receiving, using the resources allocated for acknowledgment feedback for the second TB, the acknowledgment feedback for the second TB without additional control information, wherein the resources allocated for acknowledgment feedback for the second TB not including additional control information is associated with the second instance of DCI being unsuccessfully decoded.

23. The method of claim 22, wherein the control information schedules transmission of a plurality of transport blocks (TBs), and wherein receiving the additional control information is associated with a difference between a size of the resources allocated for acknowledgment feedback for a third TB of the plurality of TBs and a size of the acknowledgment feedback for the third TB, and a difference between a size of the resources allocated for acknowledgment feedback for a fourth TB of the plurality of TBs and a size of the acknowledgment feedback for the fourth TB.

24. The method of claim 23, wherein receiving the acknowledgment feedback and the additional control information comprises:

receiving, using the resources allocated for acknowledgment feedback for the third TB, the acknowledgment feedback for the third TB and a first portion of a bit sequence of the additional control information; and receiving, using the resources allocated for acknowledgment feedback for the fourth TB, the acknowledgment feedback for the fourth TB and a second portion of the bit sequence of the additional control information.

* * * * *